US009365364B1

(12) United States Patent  
Morgan

(10) Patent No.: US 9,365,364 B1  
(45) Date of Patent: Jun. 14, 2016

(54) CONTROLLED ACCELERATION AND TRANSFER OF ITEMS VIA A ROTATING PLATFORM

(71) Applicant: Robert W. Morgan, Aiken, SC (US)

(72) Inventor: Robert W. Morgan, Aiken, SC (US)

(73) Assignee: RWM Technologies, LLC, Aiken, SC (US)

( * ) Notice: Subject to any disclaimer, the term of this patent is extended or adjusted under 35 U.S.C. 154(b) by 0 days.

(21) Appl. No.: 15/014,575

(22) Filed: Feb. 3, 2016

Related U.S. Application Data

(63) Continuation-in-part of application No. 14/680,585, filed on Apr. 7, 2015, which is a continuation of application No. 14/335,433, filed on Jul. 18, 2014, now Pat. No. 9,010,518.

(60) Provisional application No. 61/856,642, filed on Jul. 19, 2013, provisional application No. 61/867,637, filed on Aug. 20, 2013.

(51) Int. Cl.
| | |
|---|---|
| *B66B 21/02* | (2006.01) |
| *B65G 37/00* | (2006.01) |
| *B66B 21/10* | (2006.01) |
| *B65G 47/80* | (2006.01) |
| *B65G 39/18* | (2006.01) |
| *B65G 67/22* | (2006.01) |

(52) U.S. Cl.  
CPC ............... *B65G 47/80* (2013.01); *B65G 39/18* (2013.01); *B65G 67/22* (2013.01)

(58) Field of Classification Search  
CPC ........ B66B 21/02; B66B 21/10; B65G 29/00; B65G 37/00

USPC ............ 198/392, 459.2, 461.1, 617; 414/334, 414/340, 353  
See application file for complete search history.

(56) References Cited

U.S. PATENT DOCUMENTS

| 3,224,554 A | 12/1965 | Moulder et al. |
| 3,392,816 A | 7/1968 | Cox |
| 3,396,509 A | 8/1968 | Hotger |
| 3,482,529 A | 12/1969 | Paul |
| 3,727,558 A | 4/1973 | Winkle |

(Continued)

FOREIGN PATENT DOCUMENTS

| GB | 189555 | 9/1921 |
| GB | 249685 | 4/1925 |

(Continued)

*Primary Examiner* — Douglas Hess  
(74) *Attorney, Agent, or Firm* — Anderson & Levine, LLP

(57) ABSTRACT

A method and system for accelerating an item with a rotating platform having a center point, a perimeter, and a radius from the center point to the perimeter. The method and apparatus deliver the item to a center area of the rotating platform by delivering the item to a first radial distance on the rotating platform, wherein the item has a first speed at the center area and tangential to the first radial distance. Also while the rotating platform is rotating, the item is advanced, in an apparatus-controlled orderly path, from the center area to a point relative to the rotating platform that is adjacent a perimeter of the rotating platform and that is located at a second radial distance greater than the first radial distance, wherein the item has a second speed tangential to the second radial distance and the second speed is greater than the first speed. Also while the rotating platform is rotating, the item is advanced, from the point, to a location beyond the perimeter of the rotating platform.

20 Claims, 12 Drawing Sheets

(56) References Cited

U.S. PATENT DOCUMENTS

| | | |
|---|---|---|
| 3,865,041 A | 2/1975 | Bacon |
| 4,150,520 A | 4/1979 | Palmieri et al. |
| 4,369,875 A | 1/1983 | Schmitz |
| 4,370,086 A | 1/1983 | Barry |
| 4,543,886 A | 10/1985 | Spieldiener et al. |
| 4,643,628 A | 2/1987 | Pini |
| 4,941,794 A | 7/1990 | Hara et al. |
| 4,964,496 A | 10/1990 | Dexter, Jr. et al. |
| 5,033,392 A | 7/1991 | Schemitsch |
| 5,044,487 A | 9/1991 | Spatafora et al. |
| 5,065,852 A | 11/1991 | Marti |
| 5,213,048 A | 5/1993 | Kunczynski |
| 5,372,236 A | 12/1994 | Layer |
| 5,443,149 A | 8/1995 | Rohwetter et al. |
| 5,558,198 A | 9/1996 | Juarez |
| 5,746,323 A | 5/1998 | Dragotta |
| 5,772,006 A | 6/1998 | Axmann |
| 5,863,177 A | 1/1999 | Carson et al. |
| 5,954,184 A | 9/1999 | Schmitt |
| 6,302,258 B1 | 10/2001 | Verona |
| 6,368,042 B1 | 4/2002 | Gagnon et al. |
| 7,370,086 B2 | 5/2008 | Kroeker et al. |
| 7,383,937 B2 | 6/2008 | Perreault et al. |
| 7,784,405 B2 | 8/2010 | Rose et al. |
| 9,010,518 B2 | 4/2015 | Morgan |
| 9,038,816 B2 * | 5/2015 | Koike ................. A61J 7/02 198/803.16 |
| 9,211,962 B2 * | 12/2015 | Kerkeslager ....... B65G 47/1464 |
| 2005/0178082 A1 | 8/2005 | Milot |
| 2010/0282121 A1 | 11/2010 | Switzeny |
| 2010/0326791 A1 | 12/2010 | Gonzalez Alemany et al. |
| 2013/0313076 A1 | 11/2013 | Stelter et al. |

FOREIGN PATENT DOCUMENTS

| | | |
|---|---|---|
| WO | 2011/138016 A1 | 11/2011 |
| WO | 2012/048697 A2 | 4/2012 |

* cited by examiner

CONTROLLED ACCELERATION AND TRANSFER OF ITEMS VIA A ROTATING PLATFORM

CROSS-REFERENCES TO RELATED APPLICATIONS

This application is a continuation-in-part, and claims priority, and the benefit of the filing date, under 35 U.S.C. §120, of U.S. patent application Ser. No. 14/680,585, filed Apr. 7, 2015, and which is hereby incorporated herein by reference. U.S. patent application Ser. No. 14/680,585 claims priority from U.S. Pat. No. 9,010,518, filed Jul. 18, 2014 and issued Apr. 21, 2015. U.S. Pat. No. 9,010,518 claims priority, and the benefit of the filing date, under 35 U.S.C. §119 of both U.S. Provisional Application No. 61/856,642, filed Jul. 19, 2013, and U.S. Provisional Application No. 61/867,637, filed Aug. 20, 2013.

STATEMENT REGARDING FEDERALLY SPONSORED RESEARCH OR DEVELOPMENT

Not Applicable.

BACKGROUND OF THE INVENTION

The preferred embodiments relate to transit of items, such as compartments of goods, by moving, arranging, and accelerating items from one system to another, as may be used for example to advance the speed of the goods for placement onto a conveyor or otherwise dispense the items at a speed greater than that which they were earlier moving.

Rotating platforms have been described in numerous patents for dispensing items onto a moving conveyor, as seen for example in U.S. Pat. Nos. 3,224,554 and 5,044,487. In these systems, items are transferred to a surface of a rotating platform, and the items then move in an undirected fashion toward the outer perimeter of the platform, after which they are dispensed off of the moving and rotating platform, such as onto a conveyor or bin, either of which adjacent the platform edge. In U.S. Pat. No. 5,065,852, a similar characterization may be applied, but the items move to a slide and stationary bin, adjacent the rotating platform edge. Often in any of these approaches, and likely because the items move randomly toward the edge of the rotating platform, additional apparatus are located along the platform edge so as to organize, situate, or dislodge the items from one another as they arrive at that edge in a somewhat random manner.

In other rotating platform systems, an item is delivered to one edge of a rotating platform while the platform is not moving, the platform is then rotated so that the item moves to a different angular location, the platform is stopped, and then the item is transferred from the stopped rotating platform, to either a stationary or moving system. Examples of these may be seen in U.S. Pat. No. 4,941,794 and U.S. Pat. No. 7,784,405.

The present inventor has recognized, however, that preferred embodiments may facilitate a profound improvement in movement of items, such as in industrial environments and others where a number of factors combine to provide needs not addressed by the above approaches. Particularly, the preferred embodiments implement a rotating platform system that permits controlled, systematic, and efficient delivery and withdrawal of items onto a moving system or into free space at an accelerated speed as compared to the speed of initial movement of the item on the rotating platform. The preferred embodiment system may vastly reduce energy needs of existing systems in that the item movement may be achieved by allowing a conveyor to continue to advance at either an existing or reduced speed, but in any event without requiring stoppage of the conveyor as items are transferred to it. Moreover, the items may vary in size or shape and yet still may be predictably transferred without a random distribution of the items from the platform center to its edge and in some embodiments without sorting apparatus at the platform edge that is otherwise necessary in the prior art so as to accommodate such approaches. As a result, considerable savings are anticipated in energy, time, and other resources, where such savings otherwise are diminished or lost in the prior art. Further, the preferred embodiment system may profoundly affect the predictability in which items are distributed from the rotating platform, so as also to provide greater efficiencies in item transfer and scheduling.

Still other benefits will be appreciated by one skilled in the art, given an understanding of the discussion below.

BRIEF SUMMARY OF THE INVENTION

In one preferred embodiment, there is a method of accelerating an item with a rotating platform having a center point, a perimeter, and a radius from the center point to the perimeter. The method delivers the item to a center area of the rotating platform by delivering the item to a first radial distance on the rotating platform, wherein the item has a first speed at the center area and tangential to the first radial distance. Also, while the rotating platform is rotating, the method advances the item, in an apparatus-controlled orderly path, from the center area to a point relative to the rotating platform that is adjacent a perimeter of the rotating platform and that is located at a second radial distance greater than the first radial distance, wherein the item has a second speed tangential to the second radial distance and the second speed is greater than the first speed. Further, while the rotating platform is rotating, the method advances the item, from the point, to a location beyond the perimeter of the rotating platform.

Other aspects are described and claimed.

BRIEF DESCRIPTION OF THE SEVERAL VIEWS OF THE DRAWING

The preferred embodiments will be described in detail below by referring to the following accompanying drawings.

DETAILED DESCRIPTION OF THE INVENTION

The preferred embodiments relate to a system for advancing items from a first system to a second system, as shown by an example sequence from FIGS. 1 through 6. In one preferred embodiment, a singular or multiple items may be transported as a unit, such as within an interior of a cargo compartment. As demonstrated initially in FIG. 1 and in subsequent Figures and discussion, the cargo compartments move in various fashions throughout the system. In this regard, certain different considerations may apply depending on the type or other attributes of items within a compartment. Such considerations give rise to additional preferred embodiment aspects, as explored throughout this document. By way of general introduction, however, some of the following discussion generally refers to each cargo compartment, with it understood that its cargo may be goods, materials, or even inanimate or animate including humans or animals.

Starting with FIG. 1, a cargo advancement system 10 is illustrated and includes a cargo compartment $CC_1$, which as shown in later Figures is to be loaded into, or onto, another (e.g., moving) system, shown by way of example as a conveyor belt CB. The cargo compartment $CC_1$ may be constructed of various materials, dimensions, and shapes so as to accommodate the item(s) carried within it Conveyor belt CB is intended to illustrate, in this preferred embodiment, any type of moving system to which the item(s) in a compartment are to be transferred and so that the item may be continued to move to a different location. Thus, in the sense of the present illustration, the conveyor belt CB is understood to have a moving surface $CB_S$, such as a belt that is advanced by rollers $CB_R$, but in any event is any moving surface onto which an item is placed at a first absolute location, but after which the item is moved, by way of movement of the surface, to some other absolute location Note that FIGS. 1 through 6 demonstrate certain inventive aspects, but do not include various details and also are not necessarily to scale.

Figure 1:
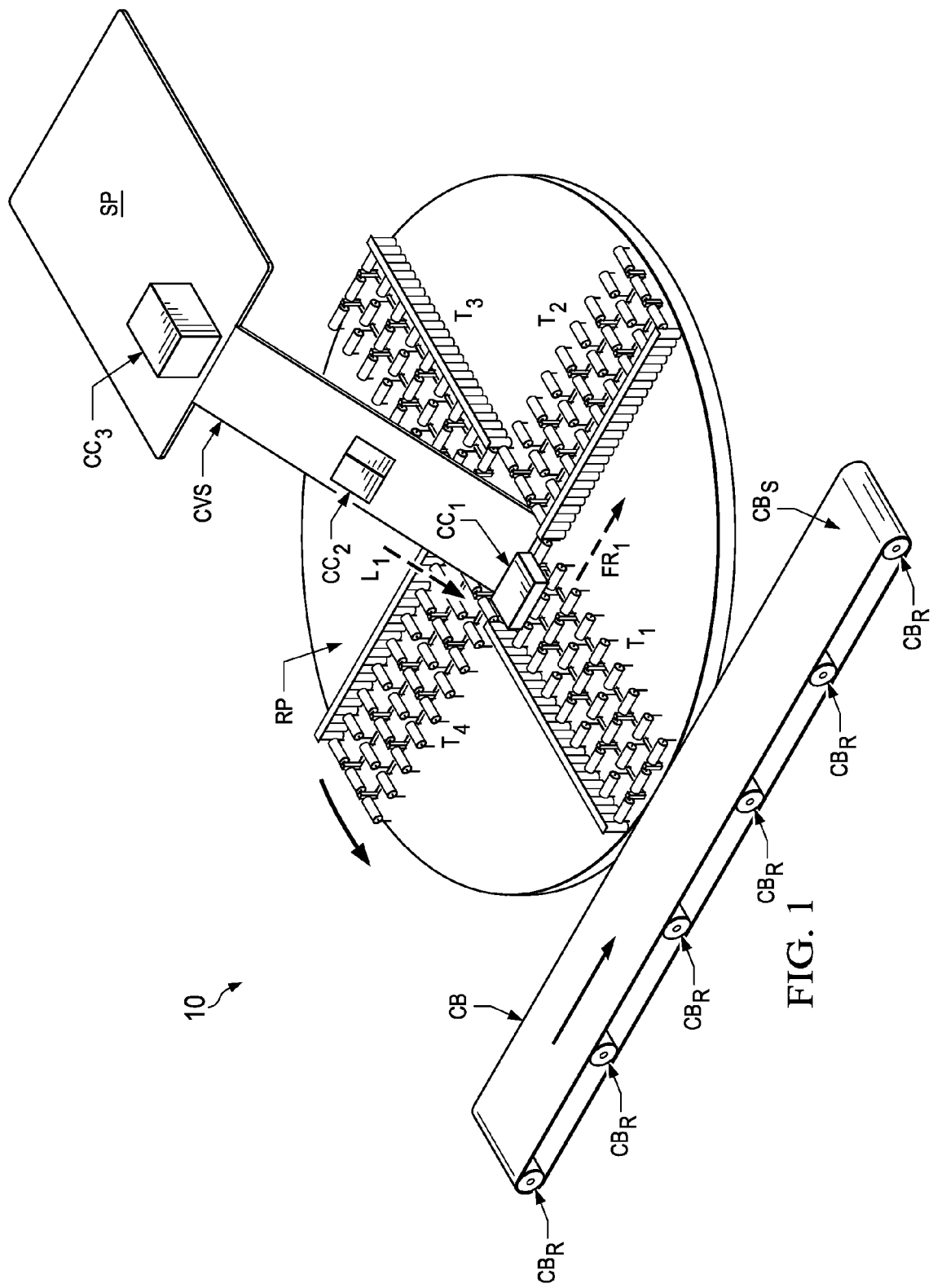
FIG. 1 illustrates a perspective view of a transit system for introducing a compartment, from a stationary platform, via a conveyor system and a rotating platform, to a moving system such as a conveyor belt.

FIG. 1 in more detail illustrates three separate apparatus for ultimately loading the cargo compartment $CC_1$ onto the conveyor belt CB: (1) a stationary platform SP, where each cargo compartment, such as the cargo compartment $CC_1$, is initially located; (2) a conveyor system CVS, having a first end adjacent the stationary platform SP, with its length extending downward from the platform; and (3) a rotating platform RP, having its center area located to receive the second end of the conveyor system CVS. Each of these apparatus is further discussed below.

In a preferred embodiment, the stationary platform SP is comparable in certain respects to a typical loading dock, that is, a location where one or more compartments may be filled (e.g., with goods), located, oriented, and sequenced. In this regard, FIG. 1 illustrates a cargo compartment $CC_3$ also located on the stationary platform SP. For the sake of discussion, the cargo compartment $CC_1$ is shown to have a respective front-to-rear orientation axis $FR_1$, which as demonstrated below will be the orientation along which the compartment ultimately takes its linear travel to conveyor belt CB. Also for sake of discussion and one preferred embodiment, and as shown in FIG. 1, the cargo compartment $CC_1$ is shown to have a lateral orientation $L_1$, so as to represent a dimension that is lateral, that is, approximately perpendicular to, the respective front-to-rear orientation axis $FR_1$. Indeed and as further appreciated below, initially with respect to the stationary platform SP, as well as the conveyor system CVS and the rotating platform RP, the cargo compartment $CC_1$ is moved along the lateral orientation $L_1$; in an alternative preferred embodiment, however, fixed orientation in this manner may be adjusted or optional for any one or more of movement with respect to the stationary platform SP, the conveyor system CVS, and the rotating platform RP. In any event, returning to the stationary platform SP, it is provided with sufficient dimensions, materials, and apparatus so that a plural number of cargo compartments may be located on the platform, preferably in a like orientation, and where each such compartment may be sequentially shifted off of the platform SP also in a same direction, as further explored below.

In a preferred embodiment, the conveyor system CVS is provided with sufficient dimensions, materials, and apparatus so as to convey, in succession, a number of cargo compartments from the stationary platform SP to the center area of the rotating platform RP. By way of example, therefore, FIG. 1 illustrates a cargo compartment $CC_2$ traversing downward, along the conveyor system CVS, from the stationary platform SP to the center area of the rotating platform RP. Preferably the descent of each cargo compartment, from the stationary platform SP to the rotating platform RP, is along an angle (i.e., non-vertical) as illustrated; in an alternative embodiment, however, an elevator-type or other comparable mechanism may be used so that each descending cargo compartment moves along a substantially vertical path. In one preferred embodiment, the vertical distance of descent is approximately 10 feet, as between the stationary platform SP and the rotating platform RP, although such a distance may be adjusted in other preferred embodiments. As shown, the bottom of the cargo compartment may follow the same angle as the path between the stationary platform SP and the rotating platform RP. In an alternative preferred embodiment, the conveyor system CVS may also include apparatus so as to maintain each conveyed cargo compartment in a relatively stable horizontal plane during movement between the stationary platform SP and the rotating platform RP, if the type of item(s) inside the compartment requires or may benefit from such orientation. In one approach, therefore, the conveyor system CVS may operate in the form of an enlarged escalator device, whereby each successive step (or horizontal platform) of such an escalator is sufficiently large so as to carry one (or more) cargo compartment, and wherein each such cargo compartment is maintained in a substantially horizontal plane during its descent from the stationary platform SP to the rotating platform RP. Another approach may use some type of overhead connection and transport system with respect to each cargo compartment, akin therefore in some respects to a gondola lift-type mechanism, for example as shown in U.S. patent application Ser. No. 14/335,433, entitled, "Mass Transit Facilitation System and Method," and which is fully incorporated herein by reference.

Figure 2:
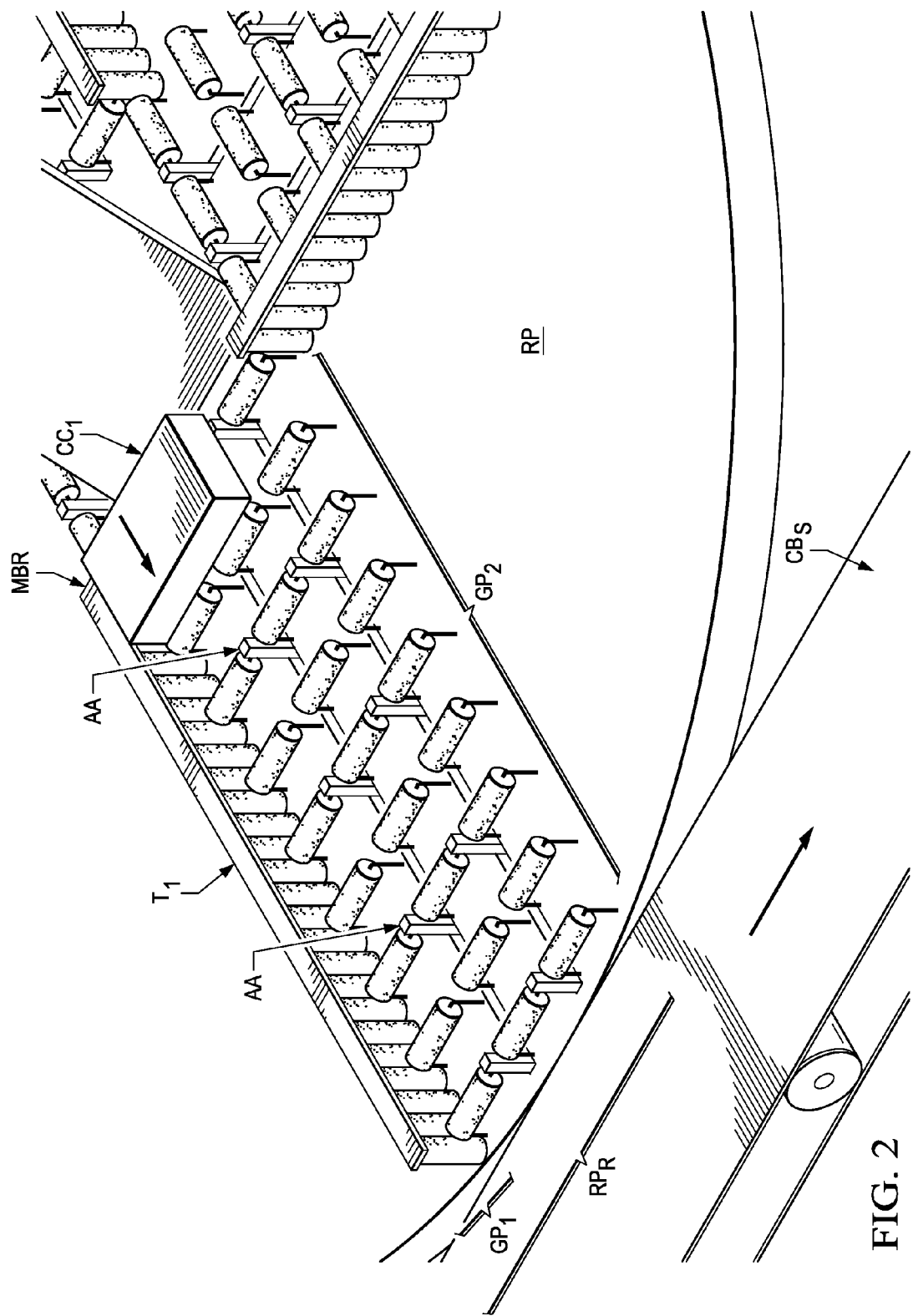
FIG. 2 illustrates the system of FIG. 1 where a compartment has advanced at a controlled speed along the conveyor system to a center area of the radial platform and to radial apparatus along a track of the rotating platform.

In a preferred embodiment, the rotating platform RP is provided with sufficient dimensions, materials, and apparatus so as to receive each cargo compartment, from the conveyor system CVS, at or near the center of rotating platform RP, while the rotating platform RP supports the weight of any such cargo compartment(s) and also while the rotating platform RP rotates. Thus, in one preferred embodiment, the rotating platform RP comprises a planar circular member, with its diameter selected according to the principles herein and the particular application. Once a cargo compartment is delivered from the conveyor system CVS to the center area of the rotating platform RP, the compartment is transferred to one of a number of available radial path tracks $T_x$, where one such path track $T_1$ is detailed in an enlarged view in FIG. 2 (and FIG. 2 illustrates a partial view of another of such paths). In the preferred embodiment, each path track $T_x$ is therefore a line from the center area to the perimeter edge of the rotating platform RP; in the example of FIG. 1, four such tracks $T_x$ are shown, equally spaced apart at 90 degrees. Given the teachings of this document, however, one skilled in the art may adjust the number of such path tracks, based on various considerations that may arise from this document as well as other factors. In any event, in a preferred embodiment, each radial track path $T_x$ includes apparatus for guiding and advancing a cargo compartment, or multiple such compartments, along that path, starting from the rotating platform center area and radially outward.

By way of example to the above, in FIG. 2 a radial path track $T_x$ has apparatus including a first group $GP_1$ of vertical rollers, with a member MBR supporting the tops of those rollers, where the first group $GP_1$ rollers provide vertical support to a portion of the cargo compartment at it moves radially outward; note also that these rollers also provide a barrier along the track $T_x$, beyond which the compartment cannot pass and preventing the compartment to moving freely or randomly on the rotating platform as otherwise could occur in response to the force from the rotating platform rotational direction (e.g., counterclockwise)—in other words, for the illustrated example of FIG. 2, the compartment is prohibited from moving to the upper left corner of the image. Further, adjacent one side of the first group $GP_1$ of rollers is a second group $GP_2$ of horizontal rollers, providing a horizontal surface along which the cargo compartment will move radially outward. Thus, together, first group $GP_1$ provides lateral support, and second group $GP_2$ provides horizontal support, to collectively provide an apparatus-controlled, defined, bordered radial path $RP_R$ along which a cargo compartment moves from the center area of the rotating platform RP to its outer perimeter.

Looking further to the second group $GP_2$ of horizontal rollers, it consists of a number of sets of rollers, each preferably at different radii from the rotating platform center, where in the example of FIG. 2 there are total of nine such equally-spaced sets, that is, one set is at a same distance from a preceding set, but at an overall larger radius than the preceding set. Each set of such rollers includes a plural number of axially co-aligned rollers, where in the example of FIG. 2 there are a total of three such rollers in each set. Thus, in FIG. 2, it may be observed that the cargo compartment $CC_1$ is located atop rollers in a first such set, closest to the center area of the rotating platform, and the compartment is contemporaneously atop rollers in a second set, at an incrementally greater radius than is located the first set. Each roller in a set of group $GP_2$ rollers is separately suspended so as to provide a gap between each axially co-aligned roller in a set. An advancing apparatus AA is located in this gap, only some of which are labeled in the Figure for simplicity; the advancing apparatus AA may be a bar, fork, or other device or member that moves at least radially along the gap, where additional apparatus is preferably located below the surface of the rotating platform RP for moving the advancing apparatus AA in this manner. The advancing apparatus AA also may be operable to move vertically, so that the upper surface of that apparatus is movable either above or below the plane of the top of the group $GP_2$ rollers, whereby the apparatus AA may move upward so as to abut a cargo compartment for advancing it radially or the apparatus AA may selectively move or retract vertically downward so as to otherwise not be in the way when not advancing a cargo compartment. As further appreciated below, therefore, the advancing apparatus AA can selectively abut a cargo compartment and with its movement thereby correspondingly advance the compartment radially, atop the horizontal rollers in group $GP_2$ and while supported laterally by the vertical rollers in group $GP_1$, as will be more readily demonstrated below. In addition, while a preferred embodiment depicts the advancing apparatus AA abutting the backside of the cargo compartment with respect to the direction in which the compartment is being advanced, such apparatus also may include other retaining members so as to control the cargo compartment from any of its other sides or its top. Lastly, note that with the advancing apparatus AA operable to move the cargo compartment with respect to the rollers, such rollers may therefore be passive devices. In an alternative embodiment, however, the rollers may be active (e.g., motor driven), so as provide their own rotational force to assist advancement of each cargo compartment toward the outer perimeter of the rotating platform RP.

As indicated generally by a curved arrow in FIG. 1, the rotating platform RP is operable to rotate, and in the example of the Figures the rotation is in a counterclockwise direction. Moreover, as further appreciated below, the rotating platform RP has a diameter and rotational speed whereby each cargo compartment advances from the center of the rotating platform RP to the outer perimeter of that platform, at which time the diameter and rotational speed of the platform contribute to a tangential speed, at the outer edge of the rotational platform RP (i.e., its cross-radial velocity component at that point) as applied to the cargo compartment. As appreciated below, this tangential speed allows the cargo compartment to be shifted, dislodged, transferred, moved or otherwise advanced to another system, such as the conveyor belt CB, where the other system may have a velocity matching that tangential speed, that is, permitting the cargo compartment to advance without substantial change in speed or direction, from an edge of the rotating platform RP to the other system.

The general operation of the system is now discussed with reference to the sequence of events depicted in FIGS. 1 through 6, starting first with FIG. 1. In FIG. 1, it should be understood that the first cargo compartment $CC_1$ was originally located on the stationary platform SP, advanced to, and descended along and by, the conveyor system CVS, to a radial path track T1 on the rotating platform RP, as is now described.

Specifically, with the cargo compartment $CC_1$ on the stationary platform SP, and with appropriate apparatus and timing, the cargo compartment $CC_1$ is advanced toward, and introduced to move onto, the conveyor system CVS. In a preferred embodiment, the cargo compartment $CC_1$ is accelerated, on the stationary platform SP, from rest to a constant speed, at which time it is moved to the conveyor system CVS. This speed will depend on various considerations, including the type of cargo being carried, its desired orientation, and system apparatus dimensions as well as desired transit speed, as explored later by way of example. Also preferably, the acceleration to such speed is along the lateral direction, so, for example, the cargo compartment $CC_1$ is moved along the lateral orientation $L_1$. As a result, the acceleration imposed on the cargo, from zero to this speed, is in the lateral $L_1$ direction.

The conveyor system CVS, possibly with the assistance of gravity, continues to advance the cargo compartment $CC_1$ by conveying it from the stationary platform SP to the center area of the rotating platform RP, preferably maintaining the constant speed at which the cargo compartment $CC_1$ was received by the conveyor system CVS from the stationary platform SP. Preferably, such movement continues along the lateral orientation $L_1$ and again while maintaining the compartment in either a horizontal orientation or along the angle of the conveyor system CVS; in either event, if there is no (or little) acceleration from the speed at which the cargo compartment $CC_1$ was received by the conveyor system CVS, then the force imposed on things inside the cargo compartment are primarily only a gravitational force downward, with little or no acceleration imposed or sensation in the lateral direction.

Note also that FIG. 1 illustrates two additional cargo compartments $CC_2$ and $CC_3$. Thus, the first cargo compartment $CC_1$ has advanced downward, along the conveyor system CVS and in the lateral orientation $L_1$, toward the center area of the rotating platform RP. The second cargo compartment $CC_2$, at the point of illustration in FIG. 1, has advanced from the stationary platform SP to a partial descent along the conveyor system CVS, in a manner timed to safely and accurately follow the advancement of the cargo compartment $CC_1$. The present inventive scope contemplates that any number of such compartments could and would benefit from being positioned to advance along the stationary platform SP sequentially behind the cargo compartments $CC_1$ and $CC_2$. Indeed, in this regard, FIG. 1 further illustrates a third cargo compartment $CC_3$, proximate an edge of the stationary platform SP, readied therefore to advance to the conveyor system CVS. Based on the discussion herein and following, therefore, additional structure and methodology aspects may be developed in terms of timing, efficiencies, and the like, in improving or optimizing the general advancement of cargo compartments from one system, to another, via the rotating platform RP, consistent with the other apparatus described herein.

As a cargo compartment reaches the center area of the rotating platform RP, note that its contents will experience a considerably lesser sense of velocity in the direction of the front-to-rear orientation axis $FR_1$, as compared to that which exists in a radial direction away from the center. Particularly, although the rotating platform RP operates at some preferred rotational speed (sometimes referred to as speed of revolution), the speed perpendicular to the radius near the center of the rotating platform RP is far less than that at its perimeter and is proportional to the location along the rotating platform RP radius. Thus, the closer the cargo compartment (e.g., $CC_1$) arrives to the absolute center of the rotating platform RP, the lesser amount of speed in this direction it will encounter. In this regard, in a preferred embodiment, the cargo compartment is delivered to a radial distance on the rotating platform RP that is no greater than 20 percent of the total radius of the rotating platform RP, and preferably at a radial distance on the rotating platform RP that is no greater than 10 percent of the total radius of the rotating platform RP.

Also in a preferred embodiment, the linear speed in the direction along the lateral orientation $L_1$, obtained during the movement of the cargo compartment $CC_x$ along the stationary platform SP, and preferably maintained during the descent along the conveyor system CVS, is matched or not substantially changed, in that orientation, at the instance that the cargo compartment is delivered from the conveyor system CVS to the center area of the rotating platform RP. In this regard, and for reasons more evident below, when the first cargo compartment $CC_1$ is delivered to the rotating platform RP, it then aligns with one of the radial path tracks $T_x$, described above in connection with FIG. 2. Each such path track $T_x$, therefore, provides a radial fixed and controlled line of travel from the rotating platform RP center area to its outer perimeter. Moreover, in order to maintain a constant (or near constant) speed in the direction along the lateral orientation $L_1$, then preferably the descent of the cargo compartment $CC_x$, and the rotation of the rotating platform RP, are timed so that a radial path RPR aligns with the direction along the lateral orientation $L_1$ when the compartment arrives to the rotating platform. For example, therefore, in FIGS. 1 and 2 when the first cargo compartment $CC_1$ is delivered to the rotating platform RP, it aligns with a radial path track $T_1$, which also aligns along the lateral orientation $L_1$ path that the compartment followed both on the stationary platform SP and along the conveyor system CVS. In this regard, a relatively constant speed is maintained in this direction.

Figure 3:
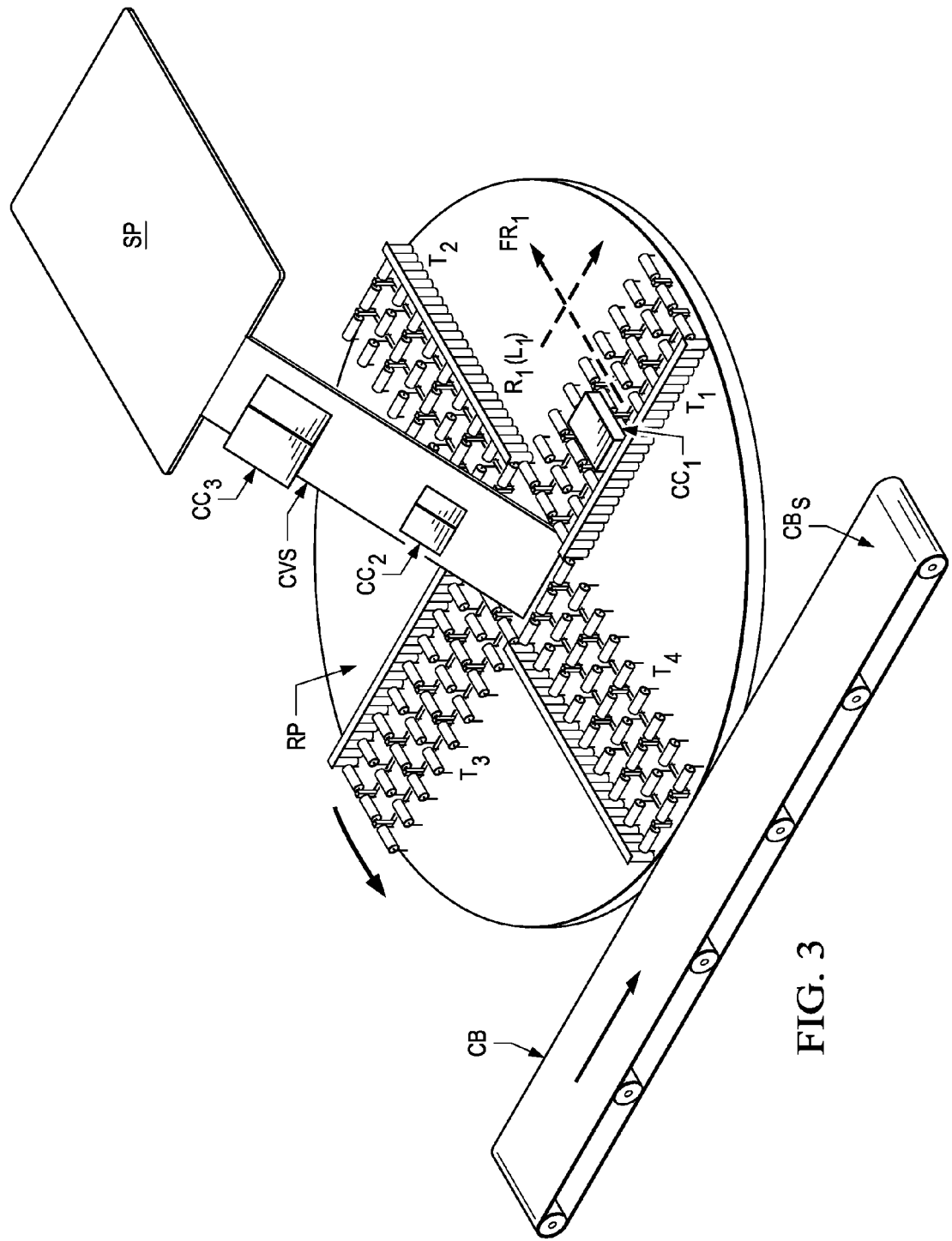
FIG. 3 illustrates the system of FIG. 1 where the first compartment of FIG. 1 from the rotating platform center area has advanced radially to a first point along a track in the rotating platform and additional compartments advance from respective locations toward the rotating platform.

In FIG. 3, the rotating platform RP has rotated 90 degrees (counterclockwise) from the illustration of FIGS. 1 and 2, and at the same time a pair of advancing apparatus AA (see FIG. 2) have advanced the first cargo compartment $CC_1$, from the center area toward but not yet reaching, the perimeter, along radial path track $T_1$. That is, with the first cargo compartment $CC_1$ having been delivered to the path track $T_1$ of the rotating platform RP, and while the rotating platform RP continues to rotate, the first cargo compartment $CC_1$ now moves radially outward, from the center area, and in a mechanically-guided, controlled, and orderly (i.e., non-random) fashion, toward the outer perimeter, of the rotating platform RP. Such motion may be assisted in part by the centrifugal force that arises from the rotation of the rotating platform RP, as well as via one or more advancing apparatus AA, aligned with the path track $T_1$. Note also, therefore, what is now the direction of radial movement with respect to the rotating platform RP, was formerly the direction along the lateral orientation $L_1$, so in FIG. 3 such direction is shown as a radial direction $R_1(L_1)$. Again, therefore, in one preferred embodiment the contents in the first cargo compartment $CC_1$ will continue to experience a constant speed in the radial direction $R_1(L_1)$. In the meantime, however, as the first cargo compartment $CC_1$ moves radially in this fashion, it will appear at an increasingly larger radial distance from the center of the rotating platform RP. Thus, acceleration occurs in a direction perpendicular to the radius of the rotating platform RP; recall, however, that starting from the stationary platform SP, and through the descent on the conveyor system CVS, a front-to-rear orientation axis $FR_1$ was established and maintained, and one skilled in the art should now appreciate therefore that this orientation is parallel to the acceleration that is perpendicular to the rotating platform RP radius. As a result, any item inside the cargo compartment should experience a front-to-rear (or rear-tofront) sense of acceleration, which should be comparable therefore to typical linear transit, as is common in cars, rail, conveyor belts, or the like. Thus, with the aspects thus described, the preferred embodiments endeavor to limit the directionality of acceleration to be only in one dimension at a time, so as to provide a predictable force on any item(s) within the cargo compartment. In addition, the preferred embodiment aspects relating to orientation as described also may be favorable to provide predictability and avoid shifting, damaging, and load-balance issues associated with contents inside a cargo compartment as well as with expected forces applied to the rotating platform RP as different cargo compartments move across it.

Figure 4:
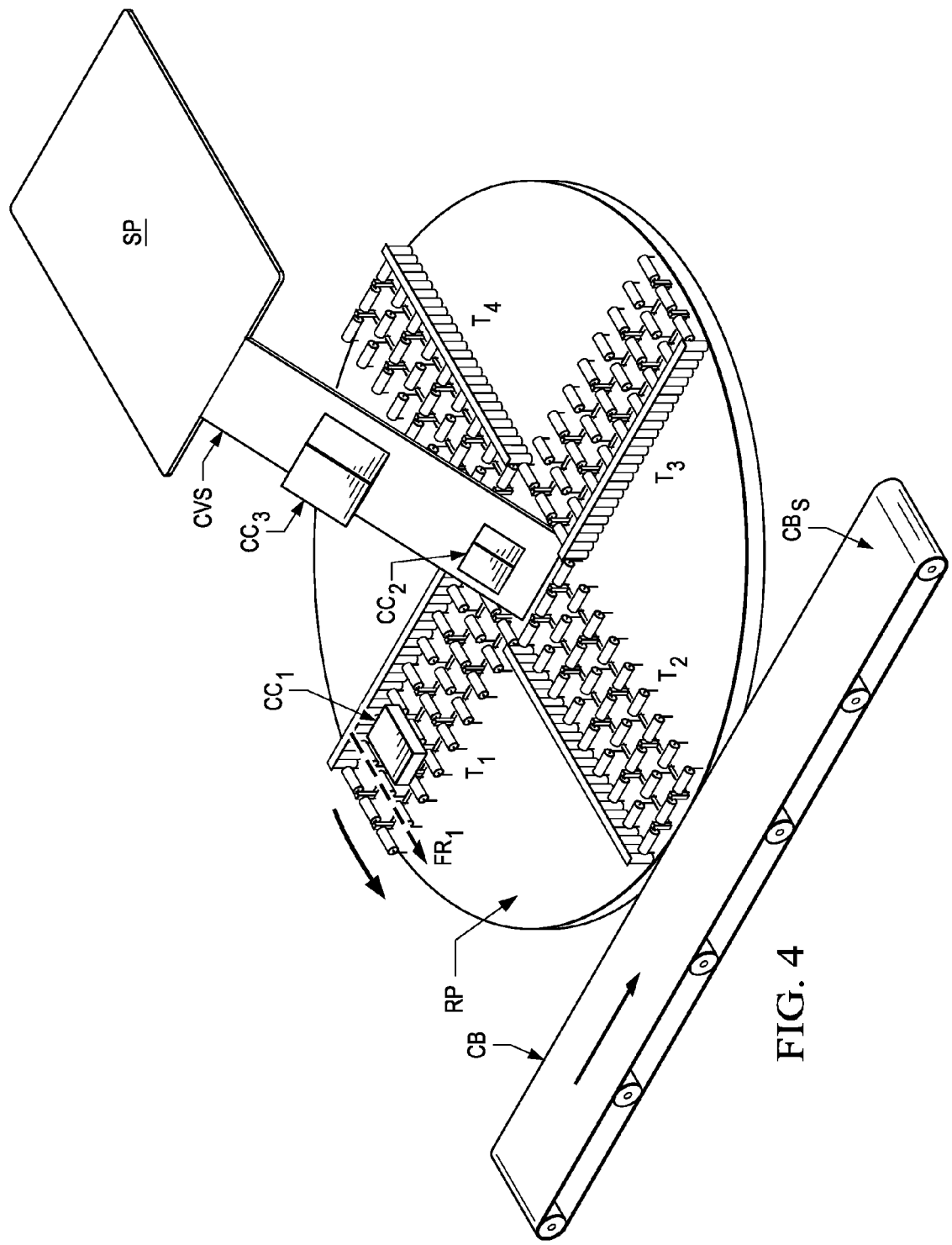
FIG. 4 illustrates the system of FIG. 3 where the rotating platform continues to rotate and the cargo compartments continue to advance.

In FIG. 4, the rotating platform RP has rotated 180 degrees from the position illustrated in FIG. 3, and the first cargo compartment $CC_1$ has advanced radially outwardly along the path track $T_1$, again in a mechanically-guided, controlled, and orderly fashion, thereby moving the cargo compartment $CC_1$ farther from the rotating platform RP center area toward its outer perimeter. Moreover, the second cargo compartment $CC_2$ has further descended along the conveyor system CVS so as to align with radial path track $T_2$ and will be set atop its horizontal rollers and abut against its vertical rollers, as shown in a later Figure. In the meantime, the third cargo compartment $CC_3$ has advanced off of the stationary platform SP and to the conveyor system CVS, so that the third cargo compartment $CC_3$ also may eventually align with a path track $T_x$ on the rotating platform RP.

Figure 5:
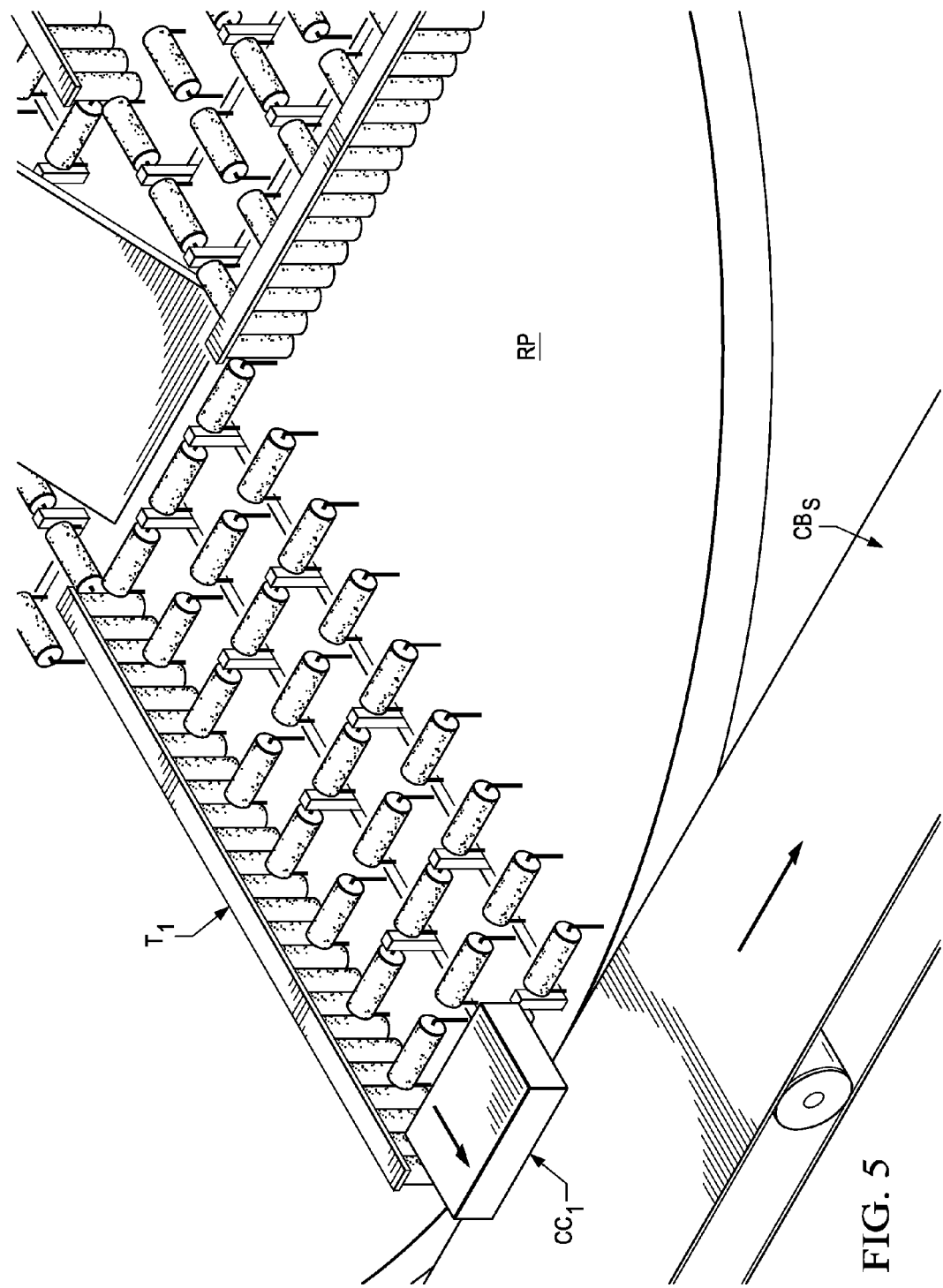
FIG. 5 illustrates a close-up view of a cargo compartment advancing from a perimeter of the rotating platform onto a conveyor belt adjacent that perimeter.

FIG. 5 illustrates an enlarged section of the rotating platform RP after it has rotated another 90 degrees (counterclockwise) from the position illustrated in FIG. 4, and the first cargo compartment $CC_1$ has advanced still farther, radially outwardly, along the path track $T_1$. Indeed, in FIG. 5, one skilled in the art will appreciate that the first cargo compartment $CC_1$ now advances beyond the perimeter of the rotating platform RP and onto the conveyor belt surface $CB_S$. Such movement may be assisted by centrifugal force, the advancing apparatus AA, and still other items so as to facilitate timing and proper transfer off of the perimeter of the rotating platform RP and onto another system, such as one moving at the same speed as the tangential speed at the perimeter of the rotating platform RP.

Figure 6:
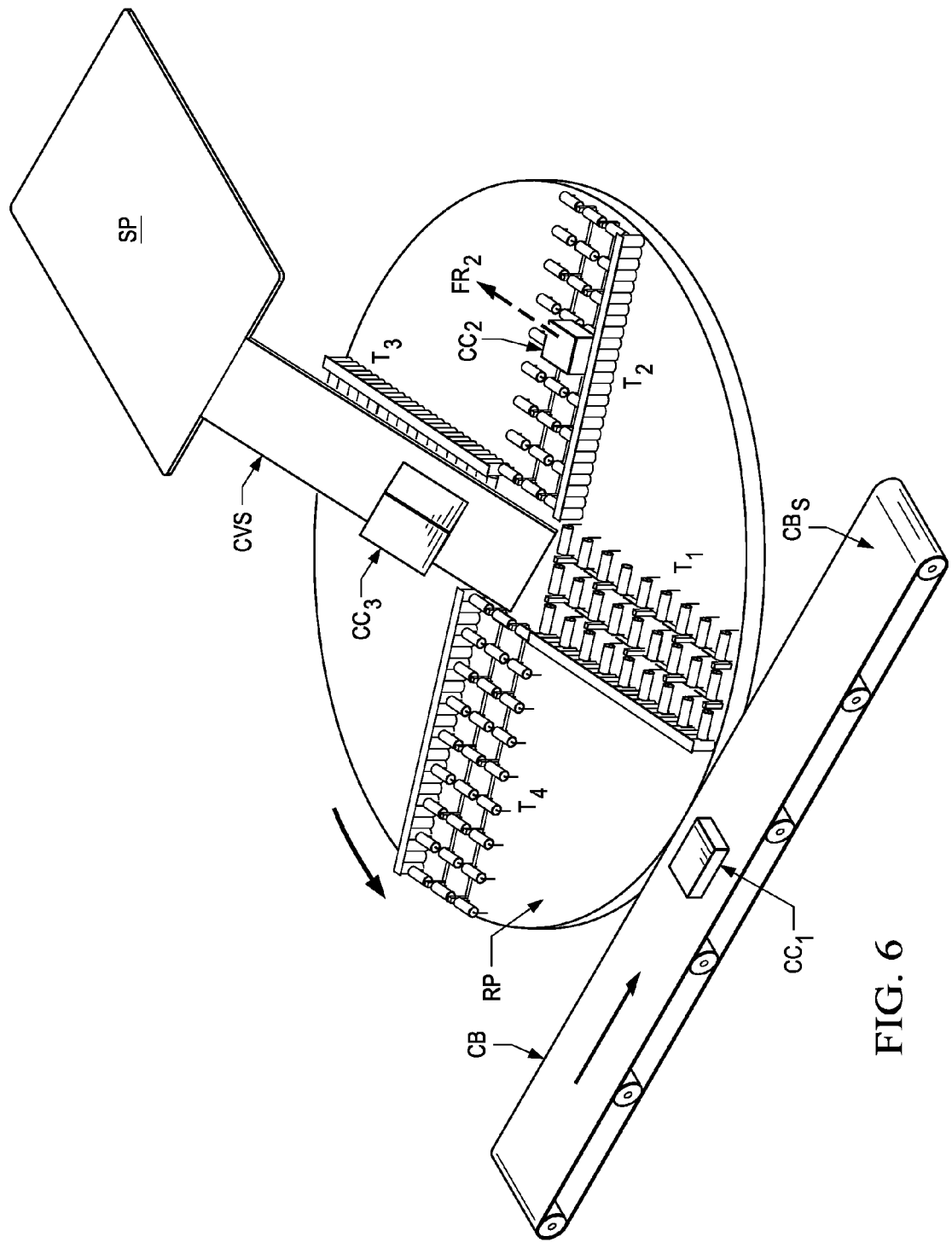
FIG. 6 illustrates the system of FIG. 1 where the first compartment is advancing along the conveyor belt, a second compartment is advancing along a respective rotating platform track, and a third compartment advances toward the center area of the rotating platform.

FIG. 6 illustrates the rotating platform RP after it has rotated a few additional degrees (counterclockwise) from the position illustrated in FIG. 5, and the first cargo compartment $CC_1$ has now moved completely from the rotating platform RP to the conveyor belt CB. In FIG. 6, the first cargo compartment $CC_1$ is beyond the edge of the conveyor belt surface $CB_S$, where such positioning may be achieved again in connection with the transferring forces from the rotating platform RP. In addition, the second cargo compartment $CC_2$ has advanced along a portion of its respective path track $T_4$, and similarly the third cargo compartment $CC_3$ has advanced farther along the conveyor system CVS, where later it too will be advanced to a respective path track $T_x$. Each of these two additional cargo compartments, therefore, will eventually reach the perimeter of the rotating platform, at which positions they may be transferred to a different system, such as to the conveyor belt CB, albeit at different respective times, with one time being when track $T_2$ is adjacent the conveyor belt CB and another time being when the track receiving the compartment $CC_3$ is adjacent the conveyor belt CB.

Alternative preferred embodiments are further provided in connection with the transfer of a cargo compartment onto a moving surface $CB_S$, where as shown later that surface also may be other moving apparatus, including a transit vehicle or the like. Specifically, the present inventor recognizes there are forces of movement and friction encountered as a cargo compartment is moved from the rotating platform RP to a second apparatus, for example, beyond the perimeter of the rotating platform RP. These forces can change the orientation of the cargo compartment and become potentially a concern, for example, for a cargo compartment of larger dimension or where there are constraints such as the area or positioning on the second apparatus to which the cargo compartment is being moved. In this regard, in one preferred embodiment, either along the radial path of the rotating platform RP and/or adjacent its perimeter, a preferred embodiment may include an apparatus for lifting the cargo compartment and placing it on the second apparatus in a manner so that the placement avoids, reduces, or minimizes the effects of the friction and movement of the second apparatus on re-orienting or otherwise disrupting a smooth transition of the compartment from the rotating platform RP to the second apparatus. Such apparatus for lifting may include a gantry type device, coupled with some vertical movability as in the manner of a crane or the like, so that the compartment is lifted along or upward near the perimeter of the rotating platform RP, moved fully beyond that perimeter, and then transferred (e.g., to another apparatus or dropped or lowered vertically) to the second apparatus. Another example, as shown below, elevates the cargo compartment along the rotating platform radial path and extends beyond the platform perimeter (e.g., with a cantilevered construction), whereby the compartment may be transferred to another apparatus, either connected to the rotating platform or on the second apparatus to which the compartment is being transferred, that receives the compartment at its elevated height and then lowers it to the surface of the second apparatus. In connection with these apparatus or still other alternatives, another preferred embodiment aspect may be to reduce the radial speed of the cargo compartment, either as it approaches, once it reaches, or just beyond the perimeter of the rotating platform RP, so as to mitigate the complexities of transferring the cargo compartment, given the forces on it and attributable to the rotating platform, to the forces that will be applied to it and attributable to the moving system, to which the compartment is being transferred.

From the above, one skilled in the art should appreciate that the sequence of Figures demonstrates that the first cargo compartment $CC_1$ is initially positioned near the center area of the rotating platform RP in FIGS. 1 and 2 where the speed perpendicular to the radius is relatively low, and thereafter with the centrifugal force and/or the operation of the advancing apparatus AA, the first cargo compartment $CC_1$ advances to an increasing radius from where it started on the rotating platform RP, all the way until it reaches the perimeter edge of the rotating platform. Accordingly, at any point that this increase in radial position occurs, the velocity of the first cargo compartment $CC_1$ relative to the path track (or linear radius) at which it is positioned is increased versus where it was earlier, that is, velocity is increasing, meaning the cargo compartment is accelerating in this direction. In a preferred embodiment, therefore, as the first cargo compartment $CC_1$ (and others) reaches the perimeter of the rotating platform, its velocity matches or approximates that of the conveyor belt CB. Accordingly, the inventive scope contemplates sufficient electromechanical control and apparatus, including a programmable system, so as to control timing and transition, to facilitate the cargo compartment reaching the rotating platform RP perimeter at a velocity near or matching the conveyor belt CB. Thereafter, the first cargo compartment $CC_1$ is loaded by releasing and transferring it from the rotating platform RP edge, or any extension thereof, onto the conveyor belt CB, by virtue of apparatus (not shown) and again potentially assisted such as with propulsion to accommodate the appropriate forces—for example, a sufficient radial force is applied to the compartment so as to move it to the conveyor belt CB and to overcome any forces in a direction other than onto the conveyor belt CB (e.g., to overcome any tangential force along the edge of the rotating platform RP). In this regard, various couplings may be included, including potentially the use of electromagnets.

Recall also that the cargo compartment $CC_1$ was oriented as shown by its axes $FR_1$ and $L_1$ in FIG. 1, and note now that in one preferred embodiment such an orientation has been maintained through FIGS. 2 through 5, and onward to FIG. 6, so that items inside the compartment will, as the acceleration occurs, be unaffected by random forces or forces in multiple different directions, thereby minimizing the chance of disorientation, damage, rearrangement or the like. Moreover, note also in preferred embodiments, the items within a compartment could be living items, including animals or humans and, as a result, such occupants will, due to maintaining this orientation as the cargo compartment $CC_1$ moves radially, have sensed acceleration primarily only in the front-to-rear sense—that is, as they advanced to a greater and greater radius on the rotating platform RP, their front-to-rear tangential speed (or speed perpendicular to the radius) increases, which is aligned with their front-to-rear orientation axis $FR_1$, while in the meantime the radial speed (left-to-right, that is, along the lateral orientation axis $L_1$) is maintained substantially the same as it was from the stationary platform SP as well as along the conveyor system CVS. In this sense and with this orientation, therefore, as the compartment is located at any location radially on the revolving platform RP, the horizontal g-forces are front-to-back along the orientation axis $FR_1$ ("eyeballs in" in aerospace parlance) and for animals or humans should be well tolerated. Indeed, such forces may well be less than those experienced in ordinary automobile (or other vehicle) acceleration. Thus, the magnitude of the major acceleration is a function of the radius (or diameter) and speed of the rotating platform RP, turntable, as well as the radial speed of the compartment. With the preferred embodiment orientation axes $FR_1$ and $L_1$, g-force experience is avoided from occurring simultaneously in more than one plane, thereby avoiding vertigo and motion sickness.

The remaining aspects of FIG. 6 illustrate that the above process preferably repeats for additional cargo compartments, in successive fashion following the loading of the first cargo compartment $CC_1$ onto the conveyor belt CB. Thus, the second cargo compartment $CC_2$ advances radially outward along the path track $T_2$, from the rotating platform center area, toward the perimeter of the rotating platform RP, and while maintaining its front-to-rear orientation axis $FR_2$ in a direction perpendicular to the radial track $T_2$. Also in the meantime, the third cargo compartment $CC_3$ advance downward from the stationary platform SP, along the conveyor system CVS, to the rotating platform RP, where it too will radially advance along a respective path track, from center to perimeter, so as to load onto the conveyor belt CB.

Given the above, the inventive scope contemplates a rotating platform for loading cargo compartments, preferably in the form of units that may carry various items, so that the outer perimeter of the rotating platform may deliver each unit to another moving system, represented in the above example as a conveyor belt. Importantly, note that so long as the rotating platform is rotating, with a determined rotational speed and radius, the tangential speed at its perimeter may be matched to the speed of the other moving system. Thus, provided proper timing is achieved in transitioning, releasing, or ejecting the cargo compartment from the rotating platform perimeter, the cargo compartment may be loaded onto the moving system without requiring the moving to change its speed or come to a stop. With this result, therefore, the time and energy otherwise required in starting and stopping the entire system may be reduced and potentially eliminated, ultimately with the cargo compartments delivered to a wide array of destinations, based on the advancement of the conveyor belt CB as well as any additional transmit mechanisms relative to that conveyor belt CB. Moreover, with the remainder of the timing and delivery brought by an initial platform, and the delivery of the compartment to the rotating platform center area, an orderly transition may be achieved, with various considerations based on the type of cargo within the compartments, so that an initial loading of the compartment may be achieved on a still platform, while the compartment is effectively accelerated to a tangential speed in the tens of miles per hour (e.g., 50 mph) by advancing the compartment in an apparatus-assisted and orderly transition in a radial fashion along the rotating platform. Moreover, the rotating platform may continuously spin during loading in this manner, thereby carrying a plurality of different compartments, along a plurality of (e.g., respective) tracks, so as to load multiple compartments to a conveyor belt or other moving system.

To further demonstrate the above aspects, and only by way of an illustrative example, various measures are now proposed for a system as in FIGS. 1 through 6. In such an example, assume that the rotating platform has a diameter of 100 feet (i.e., radius=50 feet, circumference=$2\pi r$=314 feet). Assume further that the conveyor belt CB or other moving system advances tangentially to this rotating platform at a speed of 50 miles per hour (i.e., approximately 73.33 ft/sec). Accordingly, at a tangential location at the rotating platform perimeter, a rotating platform speed of revolution of 0.234 rev/second results in a tangential speed of 50 miles per hour (i.e., 0.234 rev/second*314 ft=73.33 ft/sec). Thus, the rotating platform perimeter matches the speed of the tangentially-located moving system, and a cargo compartment $CC_x$ at that perimeter will be traveling in the tangential direction at the same speed as the moving system, thereby allowing the cargo compartment $CC_x$ to be transferred to the moving system as taught above. Also with these example numbers, recall that the cargo compartment $CC_x$ preferably moves laterally from the rotating platform center area to its outer perimeter; in the present example radius of 50 feet, then a lateral speed of 5 miles per hour will achieve this movement in approximately 7 seconds—hence, consistent with the earlier discussion, then preferably the cargo compartment $CC_x$ was accelerated to a lateral speed of 5 miles per hour when it was first accelerated on the stationary platform SP, and that speed is maintained during the travel along the conveyor system CVS and becomes radial speed along a track $T_x$ in the rotating platform RP. Lastly, with these numbers, note therefore that the acceleration along the front-to-rear orientation axis $FR_1$ will be from 0 miles per hour when the cargo compartment $CC_x$ first arrives in the rotating platform center area to 50 miles per hour at its perimeter. Having established that it will take approximately 7 seconds, at the 5 mph lateral speed, for the compartment to travel from the center area to the perimeter, then the items inside the compartment will experience, along the front-to-rear orientation axis $FR_1$, an acceleration of 0-50 mph in those approximated 7 seconds.

The above numbers, therefore, are representative of one implementation and demonstrate various aspects and viability, while of course being subject to change based on numerous considerations. Thus, different rates of acceleration, rotational velocity, and rotating platform dimensions may be desired, based on various conditions. For example, transit of items may be implemented with the preferred embodiments in numerous contexts, on either a macro or micro scale. The movement of items, therefore, could be in a manufacturing, packaging, distribution, or other commercial or industrial environment, or could include the movement of items into existing larger transportation systems, such as railways. Still other applications will be ascertainable by one skilled in the art.

The preferred embodiments also contemplate movement of cargo compartments in the reverse direction as described above, thereby transferring a cargo compartment CC from a moving system to the edge of the rotating platform RP, advancing the cargo compartment radially, along a path track $T_x$, toward the center area of the rotating platform RP, and from that area, the conveyor system CVS, or a like conveyor system, will transfer the cargo compartment CC to a stationary platform SP, at which location the compartment contents may be removed or otherwise shipped to another location. Such movement may be facilitated by using forces opposite those described above, for example, by reversing the direction of the advancing apparatus AA. In this regard, therefore, the same system as shown in FIG. 1 may be used to return one or more compartments from a moving system adjacent the rotating platform perimeter, to the rotating platform perimeter and toward the center area, while simultaneously delivering others from the center area, toward the perimeter and onto a corresponding moving system.

Figure 7:
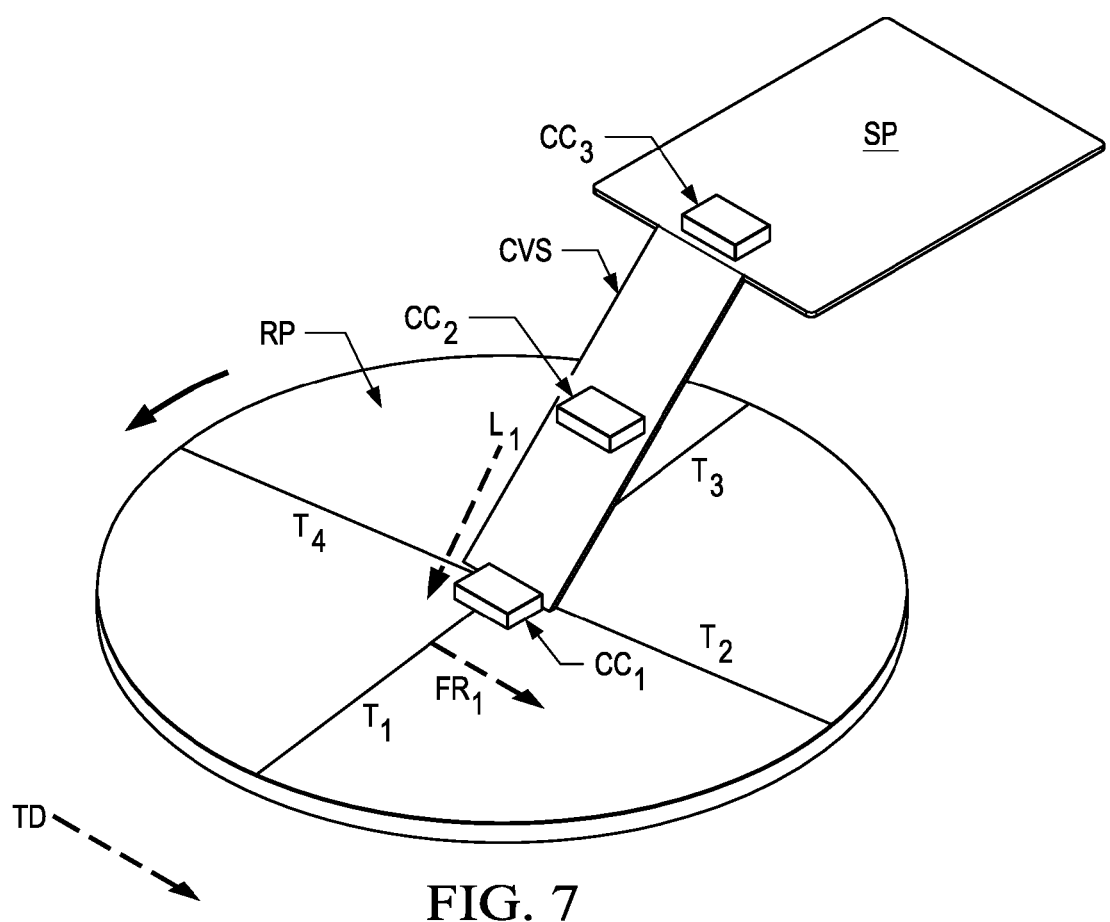
FIG. 7 illustrates an additional system with a rotating platform according to another preferred embodiment, where again the cargo compartments $CC_1$ through $CC_3$ are shown advancing at various in succession from the stationary platform SP, to the conveyor system CVS, and then to rotating platform RP, where each compartment aligns with a respective one of four tracks $T_1$ through $T_4$.

FIG. 7 illustrates an additional system with a rotating platform according to another preferred embodiment, where again the cargo compartments $CC_1$ through $CC_3$ are shown advancing at various in succession from the stationary platform SP, to the conveyor system CVS, and then to rotating platform RP, where each compartment aligns with a respective one of four tracks $T_1$ through $T_4$. Thus, FIG. 7 repeats various of the earlier-described principles, and more generally illustrates the tracks $T_1$ through $T_4$, as in alternative preferred embodiments guidance along those radial paths may be effected using alternatives to that described above. In any event, each cargo compartment $CC_x$ eventually advances along its respective track toward the perimeter of the rotating platform RP, so that each compartment may be dispensed from the perimeter to a moving system that is advancing along a travel direction TD.

Figure 8:
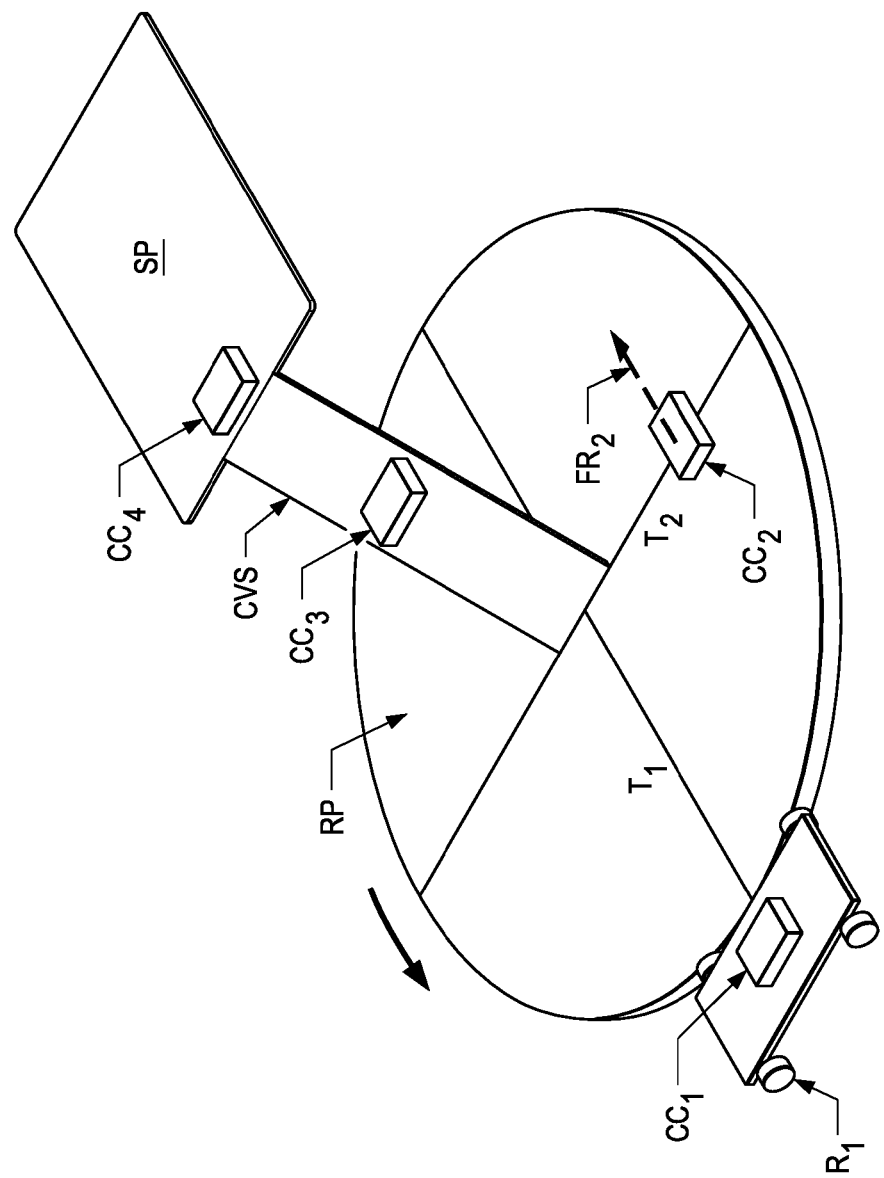
FIG. 8 illustrates the system of FIG. 7 where the first compartment has advanced along a rotating platform track to a vehicle that is adjacent the rotating platform perimeter.
Figure 8:
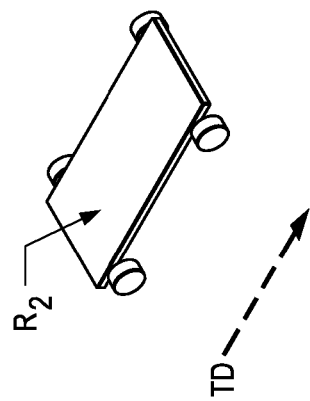

As illustrated in earlier Figures, the moving system adjacent the rotating platform RP may comprise a conveyor belt CB; in an alternative preferred embodiment, however, various other moving systems may advance along the travel direction TD, where by way of example FIG. 8 illustrates another example where the moving system is a vehicle and more particularly a railcar $R_1$. As further illustrated in FIG. 8, therefore, successive railcars, either independent of one another or attached relative to one another, may thusly pass adjacent the perimeter of the rotating platform RP, whereby one or more cargo compartments are then transferred from the rotating platform surface to either a surface of a railcar or to apparatus affixed to the railcar.

Figure 9:
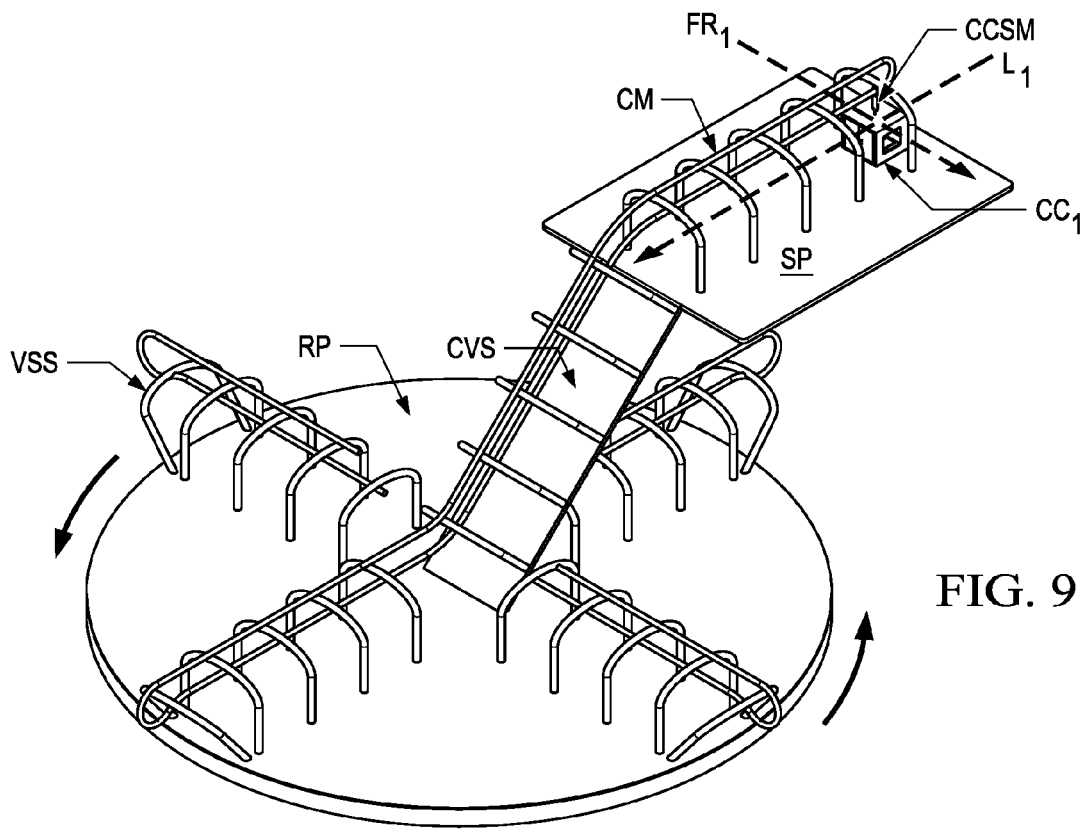
FIG. 9 illustrates still another preferred embodiment alternative, where a cargo compartment $CC_1$ is shown for transporting humans and the compartment moves along the system via an overhead support mechanism.
Figure 10:
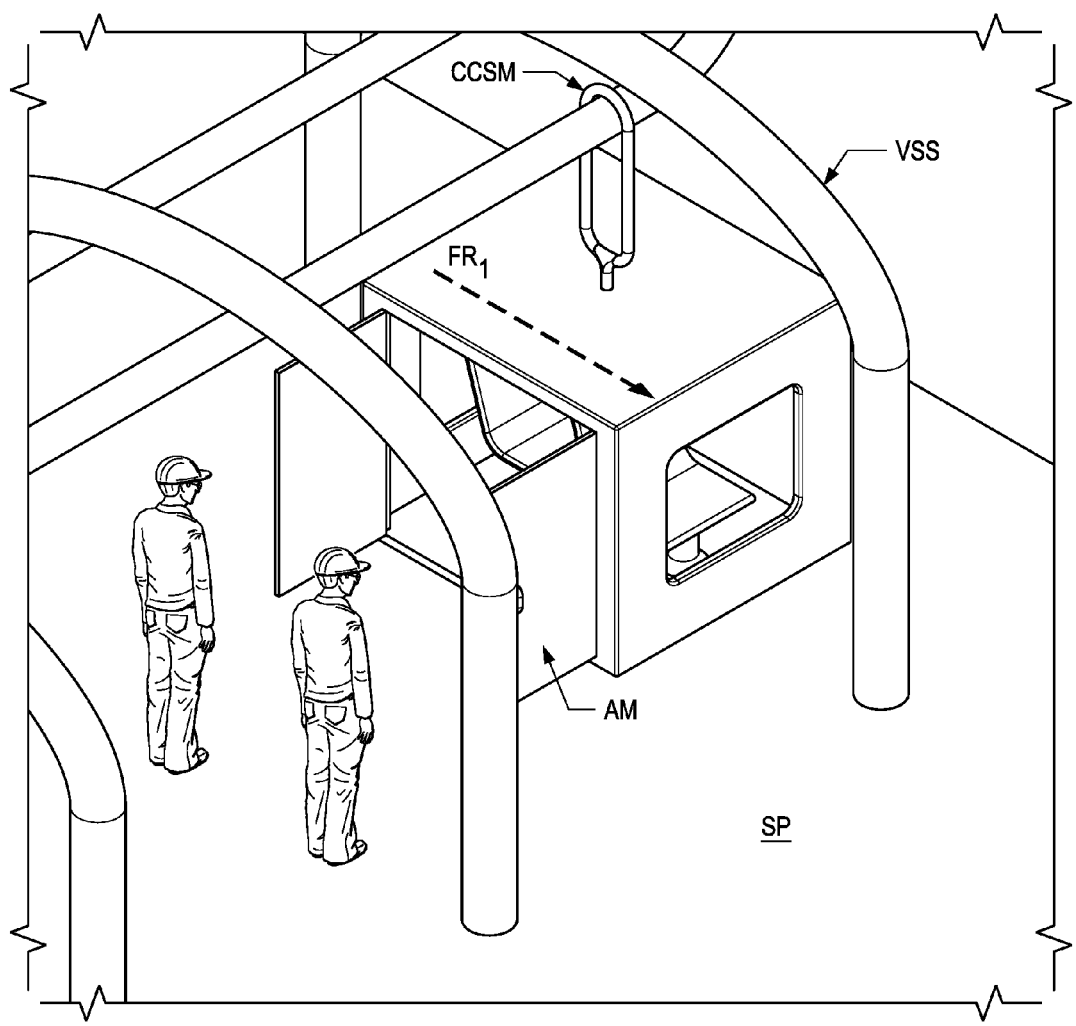
FIG. 10 illustrates with an enlarged view of the cargo compartment shown in FIG. 9.

FIG. 9 illustrates still another preferred embodiment alternative, where a cargo compartment $CC_1$ is shown for transporting humans, with an enlarged view of that cargo compartment shown in FIG. 10. As shown in FIG. 10, therefore, the cargo compartment $CC_1$ includes an access mechanism AM (e.g., one or more doors) for entry by human occupants, where additional provision is made inside the compartment for seating the occupants along the front-to-rear orientation axis $FR_1$. Thus, while as describe below the compartment $CC_1$ is positioned relative to, and slightly above, the stationary platform SP, and preferably while the compartment $CC_1$ is not moving, the occupants may step into the compartment, where preferably the floor of the compartment is within a matter of inches of the upper surface of the stationary platform SP. In this manner, ingress to the compartment $CC_1$ is facilitated, as are comfort and appearances to the human passenger so as to reduce any possible trepidation in boarding. Indeed, also in the preferred embodiment the interior accommodations of the compartment $CC_1$ are comparable to existing modes of rail car (or automotive) interiors, so as to comfort the passenger and put them at ease in the present manner of transportation. Given the above, the accommodations of the preferred embodiment as illustrated in FIGS. 9 and 10 allow the passengers to comfortably and safely board the compartment $CC_1$ and be seated, such as facing a window. Note, therefore, that such forward facing direction is along the front-to-rear orientation axis $FR_1$, as introduced earlier in connection with FIG. 1.

Returning to FIG. 9, the compartment $CC_1$ is positioned relative to the stationary platform SP, but in this embodiment the compartment $CC_1$ is supported not in contact with, but above, the surface of that platform by an overhead compartment transport system; thus, during the subsequent movement, the compartment $CC_1$, rather than coupling to, moves slightly elevated above, the platform. By way of example but without limitation, in FIG. 9 the overhead compartment transport system includes three aspects: (1) a cargo compartment support mechanism CCSM that supports the cargo compartment $CC_1$ from an overhead position relative to the compartment; (2) a conveyor mechanism CM, coupled to compartment $CC_1$ by the compartment support mechanism CCSM; and (3) a vertical support structure VSS, which in the example of FIG. 9 (and later Figures) is shown as a series of arch structures, so as to physically support the weight and functionality of the conveyor mechanism CM, the compartment support mechanism CCSM, and the corresponding compartment $CC_1$. As also appreciated from the remaining discussion, various of the FIG. 8 structure may be repeated in connection with additional compartments or different radii on the rotating platform RP. Note also that for human considerations, including safety as well as human perception as further explored below, preferably the compartment $CC_1$ is suspended at a vertical height that is close to the stationary platform, such as within a foot or less in terms of inches.

FIGS. 11 through 14 illustrate perspective three-dimensional views consistent with earlier teachings, where again the cargo compartment advances from the stationary platform, to the conveyor system CVS, to the rotating platform RP, and beyond the perimeter thereof. In these Figures, however, compartment movement is accomplished by movement of the compartment support mechanism CCSM, thereby contemporaneously moving the corresponding compartment $CC_1$, along the conveyor mechanism CM. Also in this regard, while the Figures illustrate the relationship of the compartment support mechanism CCSM as looping to a rail forming the conveyor mechanism CM, various alternatives may be implemented by one skilled in the art, with attention to engineering and human factors considerations.

Figure 11:
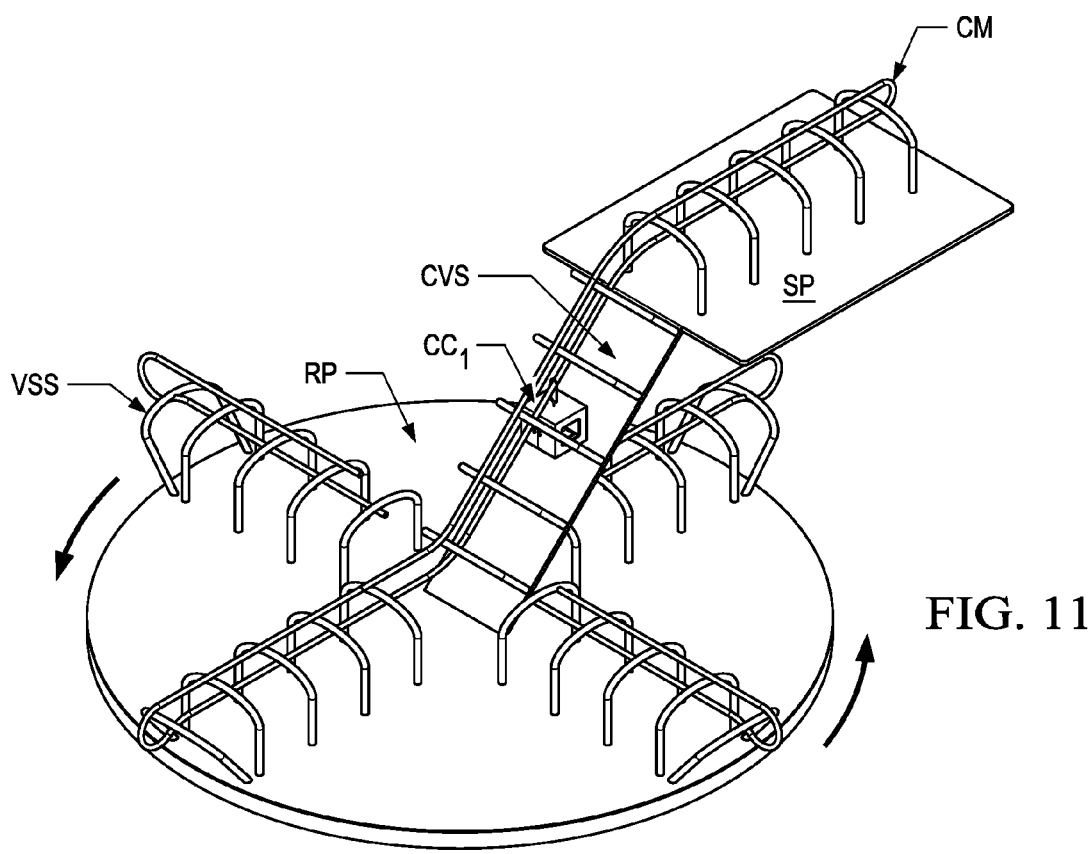
FIG. 11 illustrates the system of FIG. 9 where the first compartment has advanced from above the stationary platform to the conveyor system.

In FIG. 11, the compartment support mechanism CCSM of the overhead conveyor mechanism CM has advanced the compartment $CC_1$ in the lateral direction $L_1$ from the stationary platform SP and along the conveyor system CVS. Note in the present embodiment that, due to the overhead transport nature of this approach, the conveyor system CVS is represented by a change in vertical (and preferably angled at less than 90 degrees relative to the horizontal) path of the compartment $CC_1$, without a full support from underneath the compartment $CC_1$ and therefore without any type of escalator-type mechanism or comparable below-the-structure support, in contrast to earlier embodiments. Moreover, in the approach of FIG. 11, preferably the overhead transport system continues to advance the compartment $CC_1$ laterally at the same speed to which it was accelerated relative to the stationary platform SP, while also maintaining it in a horizontal perspective while it descends along the conveyor system CVS.

Figure 12:
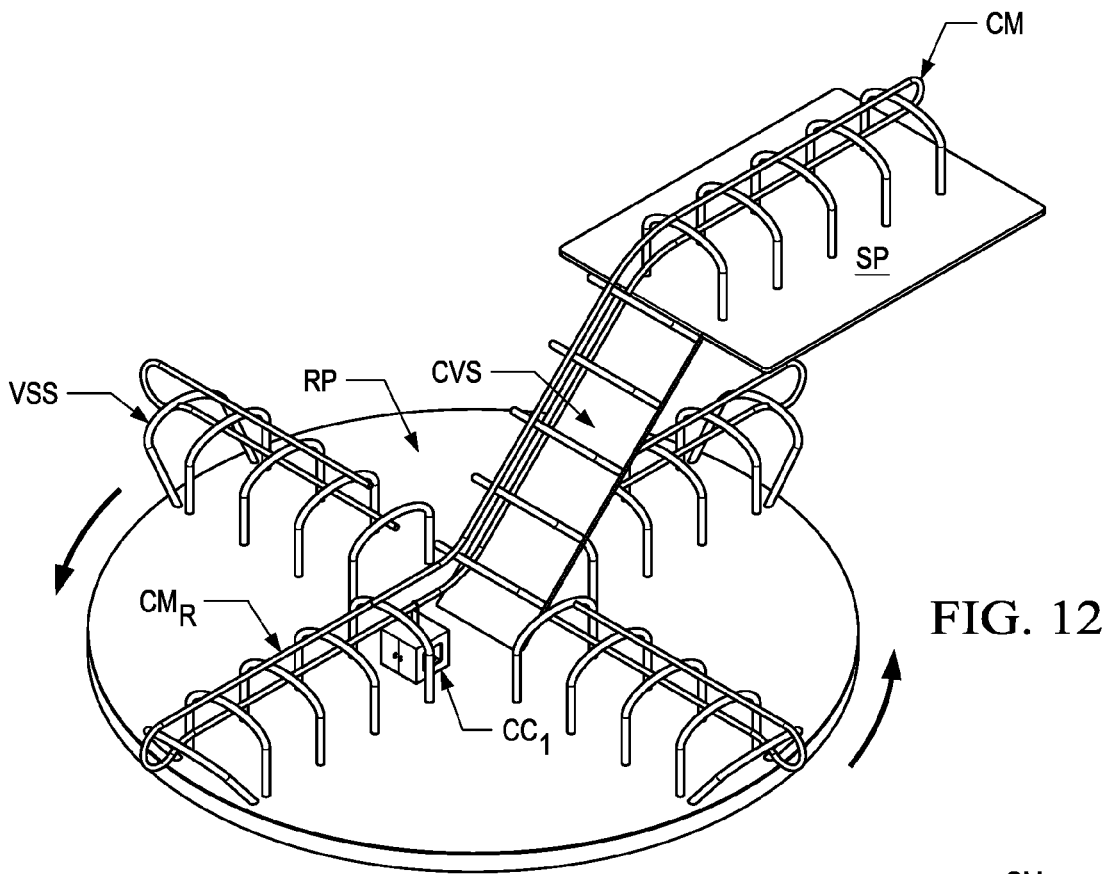
FIG. 12 illustrates the system of FIG. 9 where the first compartment has advanced to a rotating platform track.

In FIG. 12, the compartment support mechanism CCSM of the overhead conveyor mechanism CM has advanced the compartment $CC_1$ laterally, from the conveyor system CVS, to an overhead transport apparatus aligned radially on the rotating platform RP, again by locating the compartment $CC_1$ first in a center area of the rotating platform RP. The illustration of FIG. 12 (and others) generally illustrates a continuous path of the conveyor mechanism CM from the area of the stationary platform SP, to the area of the conveyor system CVS, to the center area (and beyond) of the rotating platform RP. One skilled in the art should recognize, however, that implementation of such a system may include couplings and interruptions to a continuous physical path; indeed, since the rotating platform RP is rotating, it is anticipated that additional couplings and accommodations are included as to facilitate the communication of the compartment $CC_1$, from what is a lateral path relative to the conveyor system, to what becomes a radial path along the rotating platform RP.

Once the compartment $CC_1$ is located in the center area of the rotating platform RP, then as described earlier the compartment $CC_1$ advances, now via the overhead transport, in a mechanically-guided, controlled, and orderly fashion, preferably along a radial direction. Due to the overhead transport nature of the present preferred embodiment approach, what was a track $T_x$ along a radius of the rotating platform RP in an earlier embodiment is achieved without a full support from underneath the compartment $CC_1$ in FIGS. 11 through 14 and, therefore, preferably without any type of below-the-structure support (or, only some minimal guidance, if desired). Thus, in the approach of FIG. 12 (and others), the overhead transport system, instead of a track $T_x$, continues to advance the compartment $CC_1$ in a manner that was laterally, and now is perceived as radially. Further, this advancement is again preferably at the same speed to which the compartment $CC_1$ was accelerated relative to the stationary platform SP and moved in alignment with the conveyor system CVS. To further illustrate this aspect, in FIG. 12 (and FIGS. 13 and 14), the portion of the conveyor mechanism CM of the overhead transport that extends radially with respect to the rotating platform is designated as $CM_R$. Lastly, just as the compartment $CC_1$ was described as within several inches of the stationary platform earlier, in the preferred embodiment this same vertical height is maintained relative to the rotating platform RP once the compartment $CC_1$ is communicated to the conveyor mechanism $CM_R$.

Figure 13:
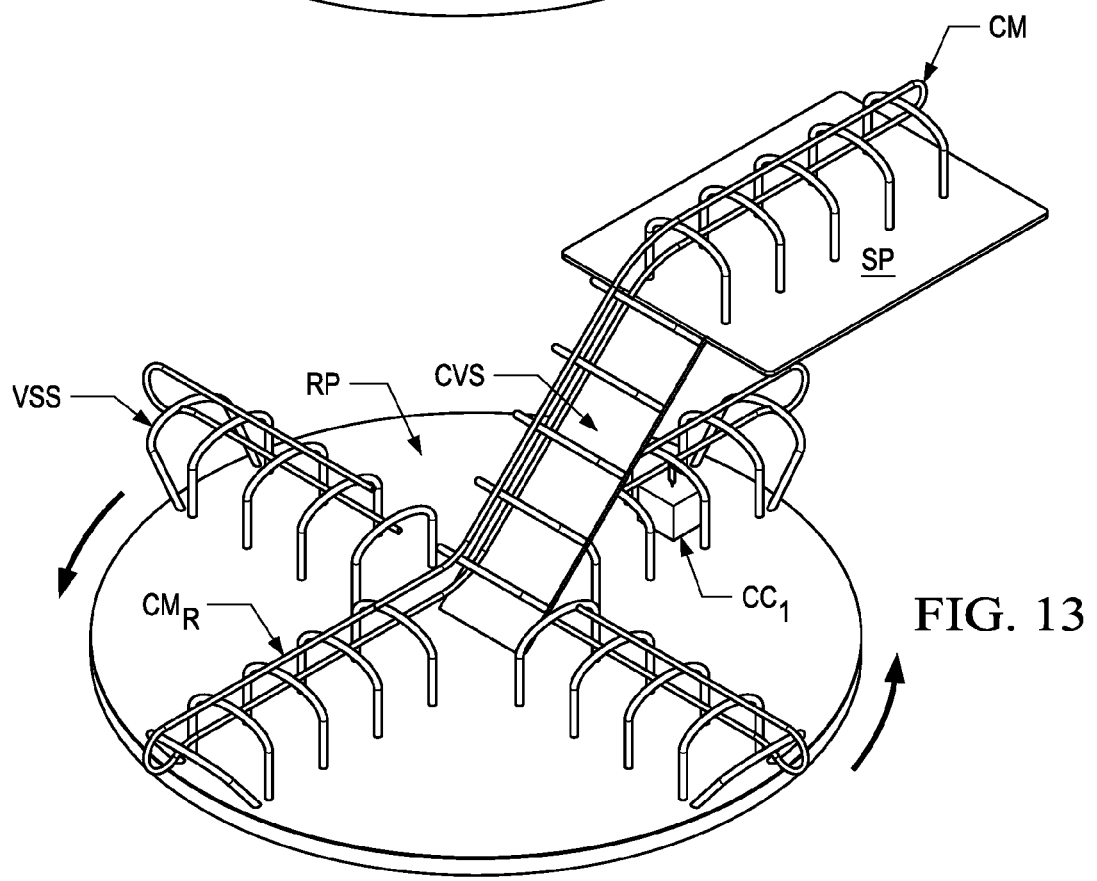
FIG. 13 illustrates the system of FIG. 9 where the first compartment has advanced farther along a rotating platform track and toward the rotating platform perimeter.

In FIG. 13, the conveyor mechanism $CM_R$ of the overhead transport, on the rotating platform RP, has advanced the compartment $CC_1$ radially, while the rotating platform RP is rotating. As with the earlier embodiments, therefore, at the same time as the compartment $CC_1$ moves radially, it accelerates in a direction perpendicular to the radius of the rotating platform RP. As also demonstrated earlier, therefore, the compartment passengers (or contents) will experience only a modest constant speed laterally with little or no acceleration (i.e., change in speed) in that direction, while concurrently sensing an acceleration from near zero and then upward (e.g., to 50 mph) in their front-to-rear orientation axis $FR_1$.

Figure 14:
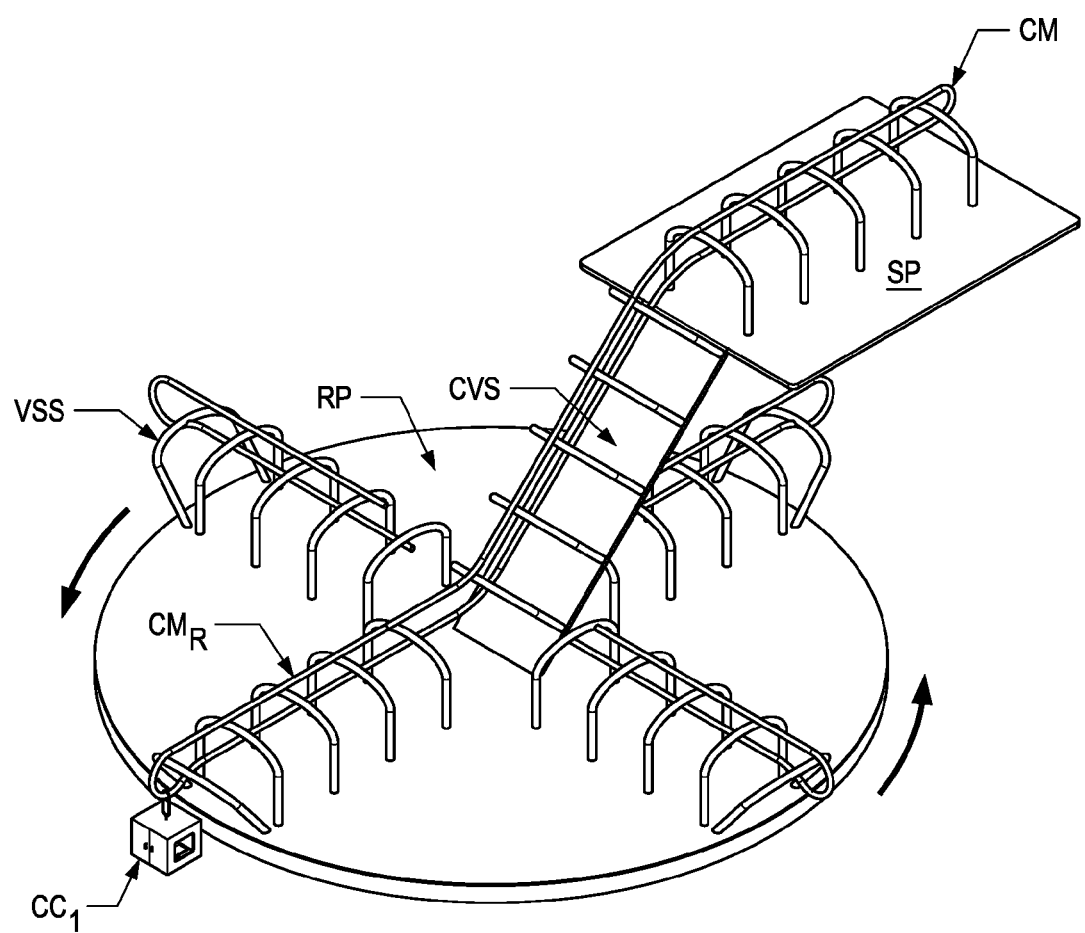
FIG. 14 illustrates the system of FIG. 9 where the first compartment has advanced beyond the rotating platform perimeter and is positioned for transfer to a moving system.

In FIG. 14, the conveyor mechanism $CM_R$ of the overhead transport on the rotating platform RP has continued to advance the compartment radially, while the rotating platform RP is rotating, to a position beyond the perimeter of the rotating platform RP. In this regard, note also that the preferred embodiment overhead transport includes apparatus that extend beyond the perimeter of the rotating platform RP; in the illustrated embodiment, such apparatus is achieved by extending the overhead conveyor mechanism $CM_R$ beyond the platform perimeter, such as by having the last arch in the series of radial arches leaning in a non-vertical fashion, away from the rotating platform, as may be achieved using a cantilevered structure or methodology. With such an attribute, and as shown in FIG. 14, the compartment $CC_1$ is still mechanically coupled relative to the rotating platform RP and the transport system, while being able to extend beyond the platform perimeter and also being readied for release to an accompanying and corresponding rail car or other moving system, which is not shown in FIG. 16 but may cooperate with the system in the same general way as described earlier. With the lateral extension of the conveyor mechanism $CM_R$ beyond the rotating platform perimeter, however, the compartment $CC_1$ may be released in a more vertical fashion, thereby requiring a less complicated, and potentially more comforting and safely-implemented, manner of transmission of the compartment from the rotating system to the moving system. Lastly, note that the conveyor mechanism $CM_R$ may include apparatus, such as a pivoting mechanism or a curve in the path of the conveyor mechanism $CM_R$, to permit small rotational changes (e.g., less than 10 degrees) to the orientation of the compartment $CC_1$, such as when releasing the compartment $CC_1$ to the rail car so as to accommodate the difference in angular movement from the rotating platform perimeter to the linear movement of the rail car, and potentially also to facilitate the handoff of the compartment $CC_1$ from the conveyor mechanism CM portion associated with the conveyor system CVS to the conveyor mechanism $CM_R$ portion associated with the rotating platform RP.

Given the preceding, the preferred embodiments provide an improved system that controls acceleration and transfer of items via a rotating platform. These embodiments provide numerous benefits over the prior art and may have profound impact on the transportation of items. As one benefit, items (and passengers) may be moved in an orderly fashion from a stationary location to another system, such as a moving system including a conveyor belt or rail car, without requiring the other system to stop, or in some instances without it having to slow its speed—such an approach may have considerable reduction on energy and other resource consumption. As another benefit, items may be distributed in a facility and beyond with appropriate timing and delivery, as aided by the acceleration achieved via the rotating platform. Numerous other benefits have been described, and still others will be appreciated by one skilled in the art. Further, while the inventive scope has been demonstrated by certain preferred embodiments, one skilled in the art will appreciate that it is further subject to various modifications, substitutions, or alterations, without departing from that inventive scope. For example, while certain dimensions and shapes have been provided, alternatives may be selected. As another example, more than one rotating platform may be used to service a line, with plural platforms providing either loading, unloading, or both functions. As another example, while the preferred embodiment includes a descent of a compartment cargo to a rotating platform, another approach may operate to cause an ascent of a compartment cargo to a rotating platform. Still another example is that while travel of the compartment cargo has been described to include a lateral direction along the stationary platform SP and the conveyor system CVS, and a lateral direction of movement with a front-to-rear acceleration on the rotating platform RP, such directionalities may be altered in some preferred embodiments. Thus, the inventive scope is demonstrated by the teachings herein and is further guided by the following exemplary but non-exhaustive claims.

What is claimed is:

1. A method of accelerating an item with a rotating platform having a center point, a perimeter, and a radius from the center point to the perimeter, the method comprising:
    delivering the item to a center area of the rotating platform by delivering the item to a first radial distance on the rotating platform, wherein the item has a first speed at the center area and tangential to the first radial distance;
    while the rotating platform is rotating, advancing the item, in an apparatus-controlled mechanically guided, nonrandom orderly path, from the center area to a point relative to the rotating platform that is adjacent a perimeter of the rotating platform and that is located at a second radial distance greater than the first radial distance, wherein the item has a second speed tangential to the second radial distance and the second speed is greater than the first speed; and
    while the rotating platform is rotating, advancing the item, from the point, to a moving system beyond the perimeter of the rotating platform.

2. The method of claim 1 wherein the step of advancing the item, from the point, to a location beyond the perimeter of the rotating platform, comprises advancing the item to a moving system that is moving independent of the rotating platform.

3. The method of claim 1 wherein the step of advancing the item, in an apparatus-controlled mechanically guided, nonrandom orderly path, comprises advancing the item in a linear radial path from the center area to the point relative to the rotating platform that is adjacent the perimeter of the rotating platform.

4. The method of claim 3 wherein the step of advancing the item, in an apparatus-controlled mechanically guided, nonrandom orderly path, comprises advancing the item along a horizontal rolling surface.

5. The method of claim 4 wherein the horizontal rolling surface comprises a plurality of horizontal rollers arranged in sets of co-linear rollers.

6. The method of claim 3 wherein the step of advancing the item, in an apparatus-controlled mechanically guided, nonrandom orderly path, comprises advancing the item along a vertical rolling surface.

7. The method of claim 6 wherein the vertical rolling surface comprises a plurality of vertical rollers.

8. The method of claim 3 wherein the step of advancing the item, in an apparatus-controlled mechanically guided, nonrandom orderly path, comprises advancing the item along a horizontal rolling surface and a vertical rolling surface.

9. The method of claim 1 wherein the first radial distance on the rotating platform is no greater than 20 percent of the radius of the rotating platform.

10. The method of claim 1 wherein the first radial distance on the rotating platform is no greater than 10 percent of the radius of the rotating platform.

11. The method of claim 1 wherein the step of advancing the item, in an apparatus-controlled mechanically guided, nonrandom orderly path, comprises maintaining a front-to-rear orientation of the item in a direction tangential to the radius of the rotating platform from the center area to the point relative to the rotating platform that is adjacent the perimeter of the rotating platform.

12. The method of claim 1 wherein the step of advancing the item, in an apparatus-controlled mechanically guided, nonrandom orderly path, comprises maintaining a fixed orientation of the item from the center area to the point relative to the rotating platform that is adjacent the perimeter of the rotating platform.

13. The method of claim 1 wherein the step of advancing the item, from the point, to a moving system beyond the perimeter of the rotating platform, comprises advancing the item to a conveyor belt.

14. The method of claim 1 wherein the step of advancing the item, in an apparatus-controlled mechanically guided, nonrandom orderly path, comprises advancing the item with an apparatus that moves in a linear radial path along the rotating platform.

15. The method of claim 1 wherein the step of advancing the item, from the point, to a moving system beyond the perimeter of the rotating platform, comprises advancing the item to a moving vehicle.

16. A method of implementing a transit system, comprising:
    delivering a cargo compartment to a center area of a rotating platform;
    while the rotating platform is rotating, advancing the cargo compartment, in an apparatus-controlled mechanically guided, nonrandom orderly path, from the center area to a point relative to the rotating platform that is adjacent a perimeter of the rotating platform; and
    while the rotating platform is rotating, advancing the cargo compartment, from the point, to a second moving system that is adjacent the rotating platform and proximate the point.

17. The method of claim 16 wherein the step of advancing the cargo compartment, from the point, to a second moving system, comprises advancing the cargo compartment while the second moving system is moving.

18. The method of claim 17 wherein the second moving system comprises a conveyor belt.

19. A system for accelerating an item, comprising:
    a rotating platform having a center point, a perimeter, and a radius from the center point to the perimeter,
    apparatus for delivering the item to a center area of the rotating platform by delivering the item to a first radial distance on the rotating platform, wherein the item has a first speed at the center area and tangential to the first radial distance;
    apparatus for advancing the item, while the rotating platform is rotating, in an apparatus-controlled mechanically guided, nonrandom orderly path, from the center area to a point relative to the rotating platform that is adjacent a perimeter of the rotating platform and that is located at a second radial distance greater than the first radial distance, wherein the item has a second speed tangential to the second radial distance and the second speed is greater than the first speed; and
    apparatus for advancing the item, while the rotating platform is rotating, from the point, to a location beyond the perimeter of the rotating platform.

20. The system of claim 19 wherein the apparatus for advancing the item, from the point, to a location beyond the perimeter of the rotating platform, comprises apparatus for advancing the item to a moving system that is moving independent of the rotating platform.

* * * * *